US008948950B2

United States Patent
Saito et al.

(10) Patent No.: US 8,948,950 B2
(45) Date of Patent: Feb. 3, 2015

(54) DRIVE CONTROL APPARATUS OF HYBRID VEHICLE

(75) Inventors: Masakazu Saito, Hamamatsu (JP); Yoshiki Ito, Hamamatsu (JP); Masaaki Tagawa, Hamamatsu (JP); Hitoshi Ohkuma, Hamamatsu (JP); Yukihiro Hosoe, Hamamatsu (JP)

(73) Assignee: Suzuki Motor Corporation, Hamamatasu-shi, Shizuoka (JP)

( * ) Notice: Subject to any disclaimer, the term of this patent is extended or adjusted under 35 U.S.C. 154(b) by 0 days.

(21) Appl. No.: 13/985,898

(22) PCT Filed: Feb. 21, 2011

(86) PCT No.: PCT/JP2011/053689
§ 371 (c)(1),
(2), (4) Date: Nov. 26, 2013

(87) PCT Pub. No.: WO2012/114429
PCT Pub. Date: Aug. 30, 2012

(65) Prior Publication Data
US 2014/0088807 A1  Mar. 27, 2014

(51) Int. Cl.
*B60L 9/00* (2006.01)
*B60L 11/00* (2006.01)

(52) U.S. Cl.
USPC . 701/22; 701/54; 701/36; 701/9; 180/65.625; 180/65.28; 180/65.21; 903/930

(58) Field of Classification Search
USPC .............. 701/22, 36, 54, 9; 180/65.625, 65.1, 180/65.21, 65.28
See application file for complete search history.

(56) References Cited

U.S. PATENT DOCUMENTS

| 8,620,507 | B2 * | 12/2013 | Akutsu et al. | 701/22 |
|---|---|---|---|---|
| 8,838,319 | B2 * | 9/2014 | Hoshiba | 701/22 |
| 2008/0109142 | A1 * | 5/2008 | Endo | 701/54 |
| 2009/0030626 | A1 * | 1/2009 | Iwane et al. | 702/63 |
| 2012/0203414 | A1 * | 8/2012 | Akutsu et al. | 701/22 |
| 2013/0226389 | A1 * | 8/2013 | Yamazaki | 701/22 |
| 2013/0261866 | A1 * | 10/2013 | Hoshiba | 701/22 |

(Continued)

FOREIGN PATENT DOCUMENTS

| JP | 2004-262275 A | 9/2004 |
|---|---|---|
| JP | 2007-230474 A | 9/2007 |

(Continued)

OTHER PUBLICATIONS

Charging and discharging cycle design for performance evaluation of HV batteries; Komatsuzaki, K. ; Seiichi Shin ; Sawada, K. Control, Automation and Systems (ICCAS), 2012 12th International Conference on; Publication Year: 2012 , pp. 224-228.*

(Continued)

*Primary Examiner* — Cuong H Nguyen
(74) *Attorney, Agent, or Firm* — Flynn, Thiel, Boutell & Tanis, P.C.

(57) ABSTRACT

In a drive control apparatus (1) of a hybrid vehicle, a provisional target engine power calculator (17D) of a controller (17) compares provisional target engine power which is calculated from a target drive power and a target charge/discharge power with a target engine power lower limit value and, when the provisional target engine power is smaller than the target engine power lower limit value, sets the target engine power lower limit value to the provisional target engine power.

3 Claims, 14 Drawing Sheets

(56) References Cited

U.S. PATENT DOCUMENTS

| | | | |
|---|---|---|---|
| 2013/0304297 A1* | 11/2013 | Ito et al. | 701/22 |
| 2013/0311029 A1* | 11/2013 | Tagawa et al. | 701/22 |
| 2014/0081499 A1* | 3/2014 | Ito et al. | 701/22 |
| 2014/0081500 A1* | 3/2014 | Ito et al. | 701/22 |

FOREIGN PATENT DOCUMENTS

| | | | |
|---|---|---|---|
| JP | 2007-283815 A | | 11/2007 |
| JP | 2008-12992 A | | 1/2008 |
| JP | 2010-95197 A | | 4/2010 |
| WO | WO2011/045965 | * | 4/2011 |
| WO | WO2012/086061 | * | 6/2012 |

OTHER PUBLICATIONS

Energy and Battery Management of a Plug-In Series Hybrid Electric Vehicle Using Fuzzy Logic; Li, S.G. ; Sharkh, S.M. ; Walsh, F.C. ; Zhang, C.N.; Vehicular Technology, IEEE Transactions on; vol. 60 , Issue: 8; DOI: 10.1109/TVT.2011.2165571 Publication Year: 2011 , pp. 3571-3585.*

Parameters optimization and performance simulation for parallel hybrid electric vehicle; Meilan Zhou ; Hao Zhang ; Zhaoming Gao Strategic Technology (IFOST), 2011 6th International Forum on; vol. 1; DOI: 10.1109/IFOST.2011.6021013; Publication Year: 2011 , pp. 242-245.*

Minimizing HEV fuel consumption using model predictive control; Poramapojana, P. ; Bo Chen; Mechatronics and Embedded Systems and Applications (MESA), 2012 IEEE/ASME International Conference on; DOI: 10.1109/MESA.2012.6275553 Publication Year: 2012 , pp. 148-153.*

Modeling and simulation for parallel hybrid electric vehicle powertrain; Fu Zhumu ; Hou Gaolei ; Gao Aiyun; Advanced Mechatronic Systems (ICAMechS), 2011 International Conference on; Publication Year: 2011 , pp. 114-117.*

A supervisory control strategy for plug-in hybrid electric vehicles based on energy demand prediction and route preview; Feng, T. ; Yang, L. ; Gu, Q. ; Hu, Y. ; Yan, T. ; Yan, B; Vehicular Technology, IEEE Transactions on; vol. PP , Issue: 99 DOI: 10.1109/TVT.2014.2336378; Publication Year: 2014 , p. 1.*

A Practical Control Methodology for Parallel Plug-In Hybrid Electric Vehicle Powertrains; Meisel, J. ; Shabbir, W. ; Evangelou, S.A. Vehicle Power and Propulsion Conference (VPPC), 2013 IEEE; DOI: 10.1109/VPPC.2013.6671659; Publication Year: 2013 , pp. 1-6.*

Form PCT/ISA/210 International Search Report issued in International Application No. PCT/JP2011/053689 with English translation, date of mailing Jun. 14, 2011 (5 pages).

* cited by examiner

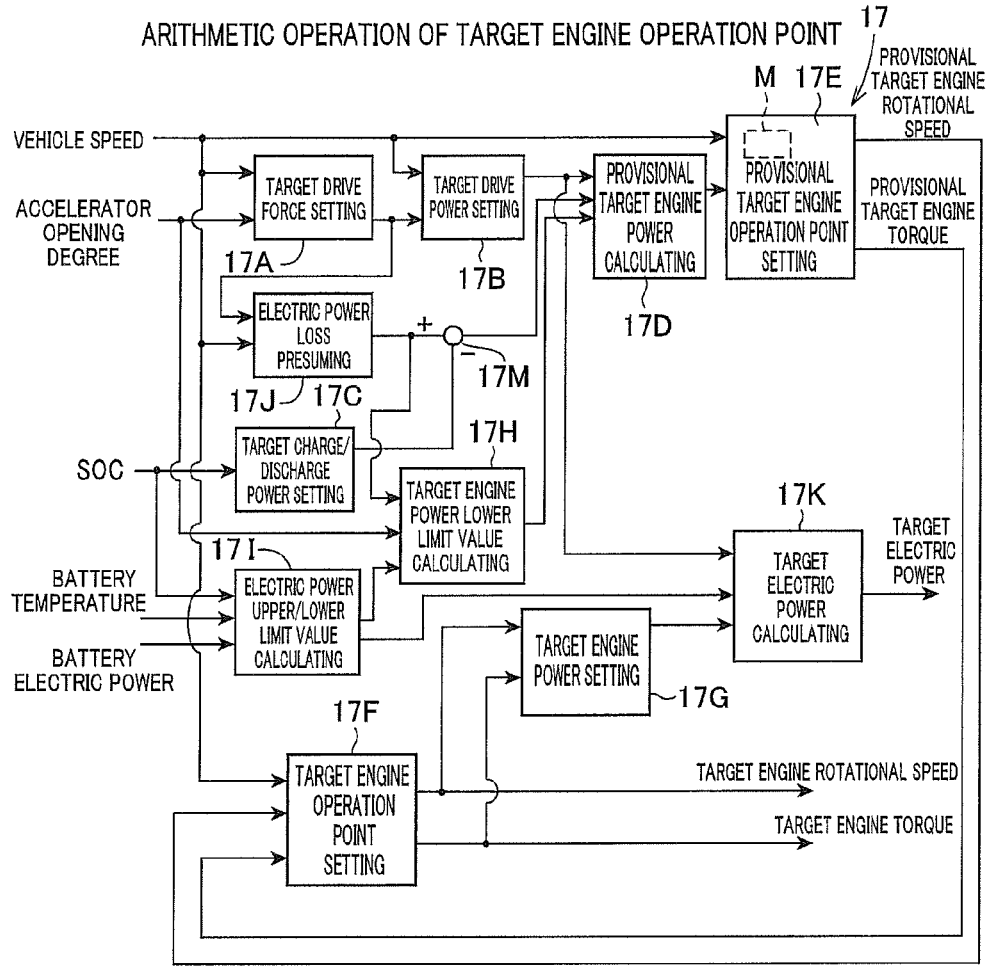
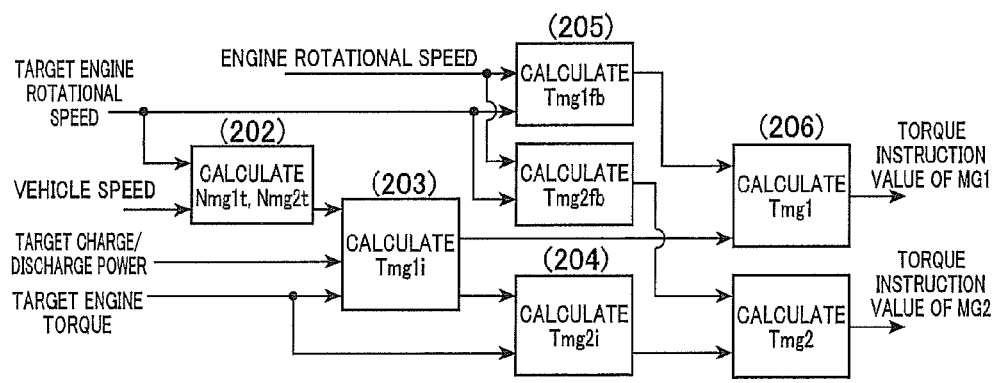

CALCULATION OF MOTOR TORQUE INSTRUCTION VALUE

ENGINE ROTATIONAL SPEED AT THE TIME OF UPPER LIMIT ROTATION OF MG1

ELECTRIC POWER UPPER/LOWER LIMIT RESTRICTION VALUE
RETRIEVAL TABLE BY THE BATTERY TEMPERATURE

ELECTRIC POWER UPPER/LOWER LIMIT RESTRICTION VALUE
RETRIEVAL TABLE BY THE BATTERY VOLTAGE

ELECTRIC POWER UPPER/LOWER LIMIT RESTRICTION VALUE
RETRIEVAL TABLE BY THE SOC

ELECTRIC POWER LOSS RETRIEVAL MAP

TARGET DRIVE FORCE RETRIEVAL MAP

TARGET CHARGE/DISCHARGE POWER RETRIEVAL TABLE

TARGET OPERATION POINT RETRIEVAL MAP

COLLINEAR DIAGRAM IN THE CASE WHERE THE VEHICLE SPEED IS CHANGED AT SAME ENGINE OPERATION POINT

EACH EFFICIENCY ON EQUAL POWER LINE

COLLINEAR DIAGRAM OF EACH POINT (D, E, F) ON EQUAL POWER LINE

FIG.19 BEST LINE OF ENGINE EFFICIENCY AND BEST LINE OF WHOLE EFFICIENCY
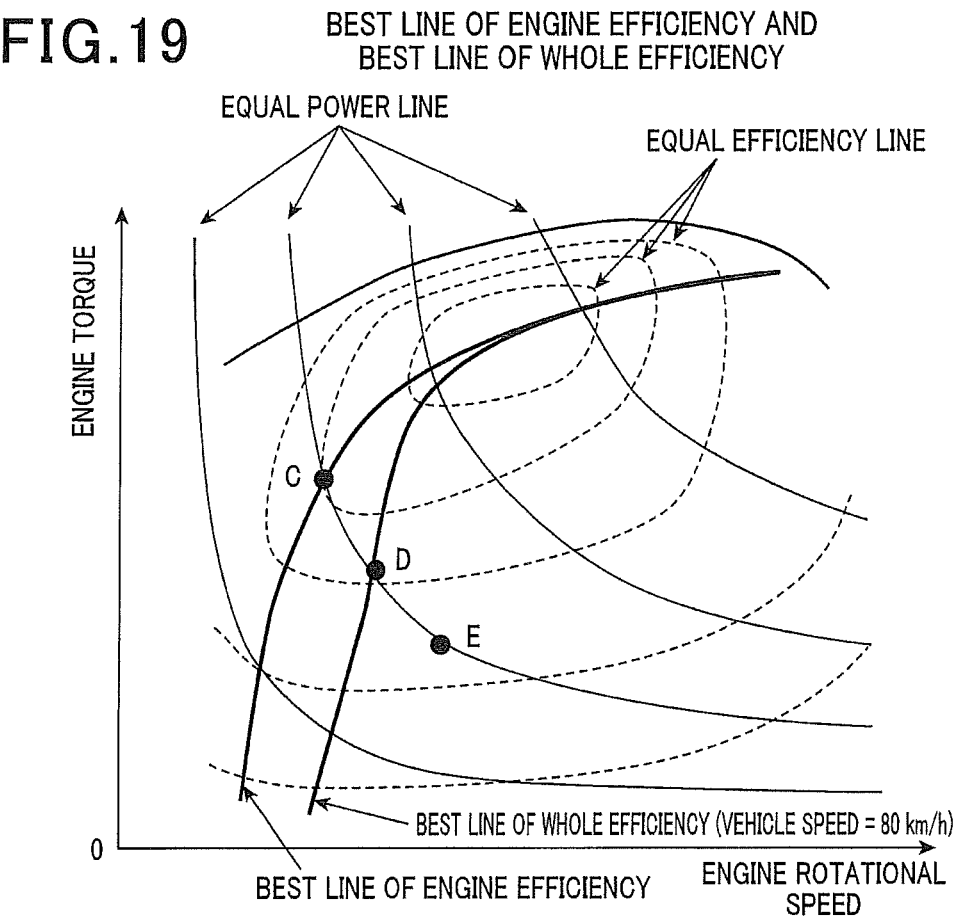
FIG.20 COLLINEAR DIAGRAM OF LOW GEAR RATIO STATE
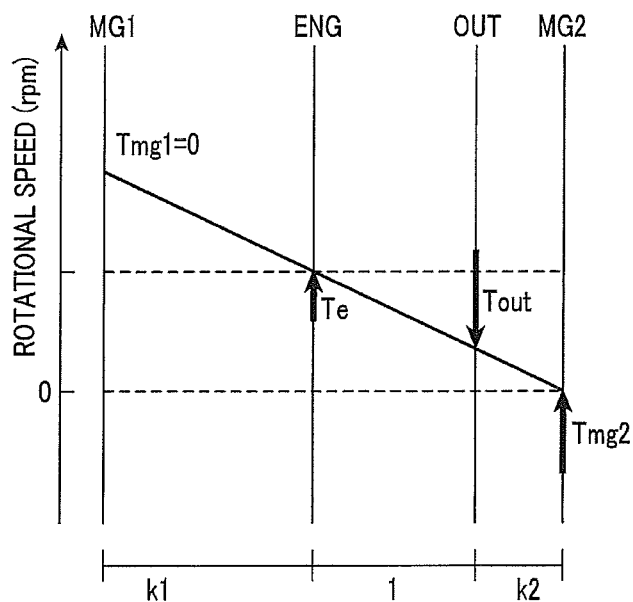

COLLINEAR DIAGRAM OF INTERMEDIATE GEAR RATIO STATE

COLLINEAR DIAGRAM OF HIGH GEAR RATIO STATE

COLLINEAR DIAGRAM OF STATE WHERE MOTIVE POWER
CIRCULATION HAS OCCURRED

DRIVE CONTROL APPARATUS OF HYBRID VEHICLE

TECHNICAL FIELD

The invention relates to a drive control apparatus of a hybrid vehicle and, more particularly, to a drive control apparatus of a hybrid vehicle which has a plurality of motive power sources and synthesizes motive powers by a power transmission mechanism and inputs/outputs to/from a drive axis, wherein an operation point of an internal combustion engine (engine operation point) in the case where a high drive force is necessary at a low vehicle speed and a motor torque for performing power assistance by an electric power of a battery are controlled.

BACKGROUND ART

As a vehicle, there is a hybrid vehicle for driving and controlling a vehicle by using outputs from an internal combustion engine and a plurality of motor generators (electric motors) as drive sources.

As such a hybrid vehicle, there are a series system (the internal combustion engine is used only to rotate the power generator and the whole driving is performed by the motor generators) and a parallel system (the internal combustion engine and the motor generator are arranged in parallel and their motive powers are used for driving).

In the hybrid vehicle, as another system of the series system and the parallel system, there is such a system that as a power transmission mechanism of a triaxial type, a motive power of an internal combustion engine is divided to a power generator and a drive axis by using one planetary gear mechanism (differential gear mechanism having three rotational elements) and two motor generators (first motor generator: MG1, second motor generator: MG2) as a motor generator and the motor generator provided for a drive axis is driven by using an electric power generated by the power generator, thereby torque converting the motive power of the internal combustion engine (the Official Gazette of Japanese Patent No. 3050125, the Official Gazette of Japanese Patent No. 3050138, the Official Gazette of Japanese Patent No. 3050141, the Official Gazette of Japanese Patent No. 3097572).

Thus, in the hybrid vehicle, the operation point of the internal combustion engine (engine operation point) can be set to an arbitrary point where a stop is included and fuel consumption is improved.

CITATION LIST

Patent Literature

PTL1: The Official Gazette of JP-A-2008-12992

In a drive control apparatus of a hybrid vehicle according to Patent Literature 1, in the case of a same engine power, the higher a vehicle speed is, the higher an engine rotational speed at a target engine operation point is.

SUMMARY OF INVENTION

Technical Problem

In the related art, in a hybrid vehicle, although not particularly similar to the series system, since a motor generator having a relatively large torque is necessary in order to obtain a sufficient torque of a drive axis and a transmission/reception amount of an electric power between the power generator and the motor generator increases in a LOW gear ratio range, an electrical loss increases and there is still a room for improvement.

As a method of solving such a point, as a power transmission mechanism of a quadruple type, there is such a structure that an output axis of an internal combustion engine, a first motor generator, a second motor generator, and a drive axis connected to a drive wheel are connected to each rotational element of the power transmission mechanism (differential gear mechanism) having four rotational elements and a motive power of the internal combustion engine and motive powers of the first motor generator and the second motor generator are synthesized and output to the drive axis. The output axis of the internal combustion engine and the drive axis are arranged to the inside rotational elements on a collinear diagram and the first motor generator on the internal combustion engine side and the second motor generator on the drive axis side are arranged to the outside rotational elements on a collinear diagram, thereby decreasing a ratio of the motive powers which are transmitted by the first and second motor generators in the motive power which is transmitted from the internal combustion engine to the drive axis, miniaturizing the first and second motor generators, and improving a transmission efficiency as a driving apparatus (the Official Gazette of JP-A-2004-15982, the Official Gazette of JP-A-2002-281607).

As a power transmission mechanism of the quadruple type, there is such a structure that a method similar to that of the foregoing structure is used and, further, the fifth rotational element is added and a brake for stopping a rotation of the fifth rotational element is provided (the Official Gazette of Japanese Patent No. 3578451).

In the foregoing power transmission mechanism of the triaxial type disclosed in the Official Gazette of Japanese Patent No. 3050125, by adding a drive force which is required for the vehicle and the electric power which is required to charge a battery, a power to be generated by the internal combustion engine is calculated, and a point where an efficiency is as high as possible is calculated from a combination of a torque serving as such a power and an engine rotational speed and is used as a target engine operation point. The first motor generator is driven and controlled so that the engine operation point becomes the target engine operation point, thereby controlling the engine rotational speed.

However, in the case of the power transmission mechanism of the triaxial type, since the torque of the second motor generator does not exert an influence on a torque balance, if a torque which is output to a drive axis by the internal combustion engine and the first motor generator is calculated from the torque of the first motor generator obtained by feedback controlling the torque of the first motor generator so that the engine rotational speed approaches a target value and the torque of the second motor generator is controlled so as to be equal to a value obtained by subtracting a value of the calculated torque from a target drive force, even when the engine torque fluctuates, the target drive force can be output from the drive axis.

However, in the case of the power transmission mechanism of the quadruple type, since the drive axis and the second motor generator have different axes and the torque of the second motor generator also exerts an influence on the torque balance and exerts an influence on the control of the engine rotational speed, the control method of the power transmission mechanism of the triaxial type mentioned above cannot be used.

In the case of the foregoing power transmission mechanism of the quadruple type disclosed in the Official Gazette of JP-A-2004-15982, the torques of the first motor generator and the second motor generator in the case where the vehicle runs in a state where there is no charge/discharge to/from a battery are calculated from a torque balance equation, the engine rotational speed is feedback controlled, and the engine rotational speed and the drive force are controlled. However, nothing is mentioned about the control in case where there is a charge/discharge to/from the battery, for example, in case where the power assistance by the electric power of the battery is performed.

Further, in a hybrid vehicle which synthesizes an output of an internal combustion engine and motive powers of a first motor generator and a second motor generator and drives a drive axis connected to a drive wheel, there is considered a method whereby: a value of a drive force obtained by adding a power corresponding to power assistance by an electric power is preset as a maximum value of the target drive force; a target drive power is obtained from the target drive force in which an accelerator opening degree and a vehicle speed are used as parameters and from the vehicle speed; a target charge/discharge power is obtained on the basis of a state of charge (SOC) of a battery; a value added to the target drive power and a maximum output which can be output by the engine are compared and a value of the smaller one of them is obtained as a target engine power; a target engine operation point is obtained from the target engine power; a target electric power serving as a target value of an input/output electric power to/from the battery is obtained from a difference between the target drive power and the target engine power; and torque instruction values of the first motor generator and the second motor generator are arithmetically operated from a torque balance equation including a target engine torque and an electric power balance equation including the target electric power.

However, according to such a method, the drive force which is required for the vehicle is large and when the vehicle speed is low, since the target drive power is calculated from the drive force which is required for the vehicle and the vehicle speed, the target drive power is equal to a small value and the target engine power is also small. Therefore, the target engine torque is also equal to a small value, the drive force becomes small by an amount corresponding to it, and the drive force which can inherently be output cannot be output, so that there is still a room for improvement.

It is, therefore, an object of the invention to provide a drive control apparatus of a hybrid vehicle, in which while accomplishing both of a point that an internal combustion engine is protected by restricting an engine operation point and a point that a drive force which is requested by the driver is satisfied by power assistance using an electric power of a battery, in the case where a large drive force is requested, such a request is satisfied, a target engine power is corrected in consideration of a battery state, thereby preventing an overcharge to the battery, control precision of a state of charge (SOC) of the battery is improved in consideration of an electric power loss of a plurality of motor generators, and the battery is protected.

Solution to Problem

According to the invention, there is provided a drive control apparatus of a hybrid vehicle for driving and controlling a vehicle by using outputs from an internal combustion engine and a plurality of motor generators, comprising: accelerator opening degree detecting means for detecting an accelerator opening degree; vehicle speed detecting means for detecting a vehicle speed; battery charge state detecting means for detecting a charge state of a battery; and control means having target drive power setting means for setting a target drive power on the basis of the accelerator opening degree detected by the accelerator opening degree detecting means and the vehicle speed detected by the vehicle speed detecting means, target charge/discharge power setting means for setting a target charge/discharge power on the basis of at least the charge state of the battery detected by the battery charge state detecting means, provisional target engine power calculating means for calculating a provisional target engine power from the target drive power set by the target drive power setting means and the target charge/discharge power set by the target charge/discharge power setting means, provisional target engine operation point setting means for setting a provisional target engine operation point to decide a provisional target engine rotational speed and a provisional target engine torque from the provisional target engine power calculated by the provisional target engine power calculating means and a retrieval map, and motor torque instruction value operating means for setting a torque instruction value of each of the plurality of motor generators on the basis of the provisional target engine operation point set by the provisional target engine operation point setting means, wherein the control means has target engine power lower limit value calculating means for calculating a target engine power lower limit value on the basis of the accelerator opening degree or a target drive force which is calculated from the accelerator opening degree and target electric power calculating means for calculating a target electric power from a difference between a target engine power and the target drive power which are calculated on the basis of the provisional target engine operation point, and wherein the provisional target engine power calculating means compares the provisional target engine power which is calculated from the target drive power set by the target drive power setting means and the target charge/discharge power set by the target charge/discharge power setting means with the target engine power lower limit value and, when the provisional target engine power is smaller than the target engine power lower limit value, sets the target engine power lower limit value to the provisional target engine power and outputs the provisional target engine power, and the motor torque instruction value operating means calculates the torque instruction value of each of the plurality of motor generators by using a torque balance equation including a target engine torque which is obtained from the target engine operation point and an electric power balance equation including the target electric power.

Advantageous Effects of Invention

According to the drive control apparatus of the hybrid vehicle of the invention, while accomplishing both of a point that the internal combustion engine is protected by restricting the engine operation point and a point that the drive force which is requested by the driver is satisfied by the power assistance using the electric power of the battery, in the case where the large drive force is requested, such a request is satisfied, the target engine power is corrected in consideration of the battery state, thereby preventing the overcharge to the battery, the control precision of a state of charge (SOC) of the battery is improved in consideration of the electric power loss of the plurality of motor generators, and the battery can be protected.

BRIEF DESCRIPTION OF DRAWINGS

FIG. 2 is a control block diagram for calculating a target engine operation point and a target electric power. (Embodiment)

FIG. 3 is a control block diagram for calculating a torque instruction value. (Embodiment)

FIG. 19 is a diagram showing a best line of an engine efficiency and a best line of the whole efficiency. (Embodiment)

FIG. 20 is a collinear diagram of a LOW gear ratio state. (Embodiment)

DESCRIPTION OF EMBODIMENTS

According to the invention, such an object of the invention that while accomplishing both of a point that an internal combustion engine is protected by restricting an engine operation point and a point that a drive force which is requested by the driver is satisfied by power assistance using an electric power of a battery, in the case where a large drive force is requested, such a request is satisfied, a target engine power is corrected in consideration of a battery state, thereby preventing an overcharge to the battery, control precision of a state of charge (SOC) of the battery is improved in consideration of an electric power loss of a plurality of motor generators, and the battery is protected is realized by a method whereby the plurality of motor generators are controlled by restricting a lower limit of the target engine power, the restriction of the lower limit is corrected by correcting a target electric power is corrected on the basis of input/output restriction of the battery, and further, the restriction of the lower limit is corrected by correcting the target electric power on the basis of the electric power loss.

Embodiments

FIGS. 1 to 23 show an embodiment of the invention.

Figure 1:
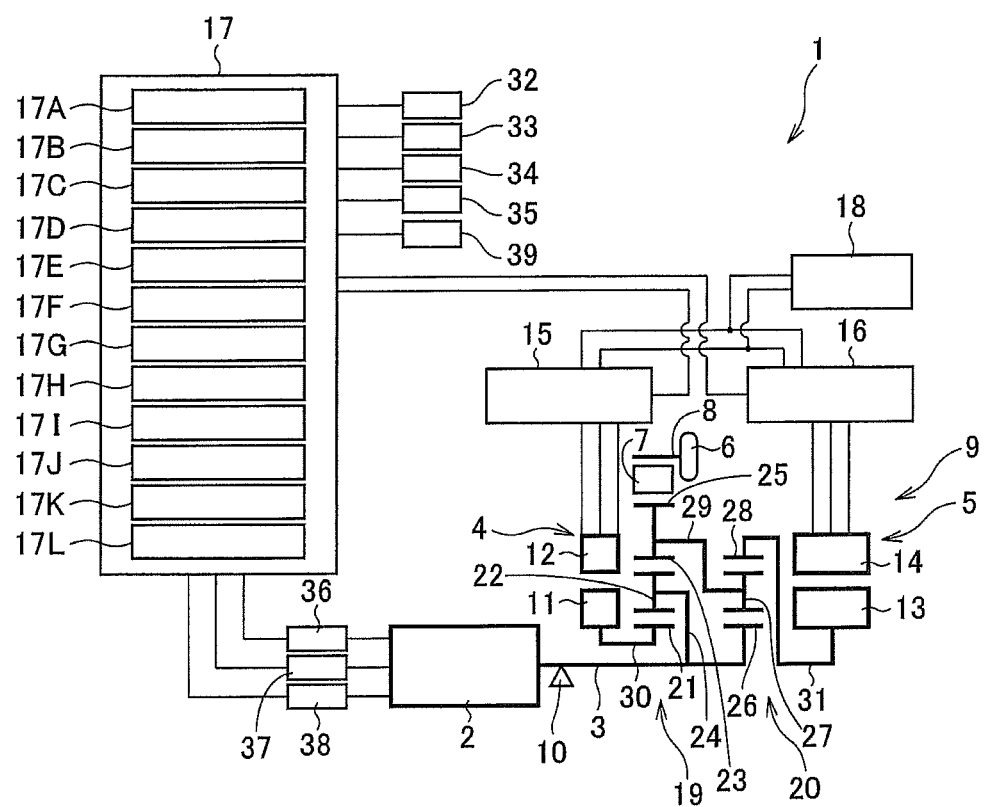
FIG. 1 is a system constructional diagram of a drive control apparatus of a hybrid vehicle. (Embodiment)

In FIG. 1, reference numeral 1 denotes a drive control apparatus of a hybrid vehicle as an electric vehicle.

The drive control apparatus 1 has: an output axis 3 of an internal combustion engine (referred to as "ENG" in the diagram) 2 serving as a drive source for outputting a torque; a first motor generator (referred to as "MG1" in the diagram) 4 and a second motor generator (referred to as "MG2" in the diagram) 5 serving as a plurality of motor generators (electric motors); a drive axis (referred to as "OUT" in the diagram) 8 connected to a drive wheel 6 through an output transfer mechanism 7; and a power transmission mechanism (differential gear mechanism) 9 coupled with the output axis 3 of the internal combustion engine 2, the first motor generator 4, the second motor generator 5, and the drive axis 8, respectively.

On the internal combustion engine 2 side, a one-way clutch 10 is provided on the way of the output axis 3 of the internal combustion engine 2. The one-way clutch 10 is provided to prevent the internal combustion engine 2 from rotating reversely. When the EV (electric vehicle) runs, the one-way clutch 10 receives a torque reaction of the second motor generator 5.

The first motor generator 4 is constructed by a first rotor 11 and a first stator 12. The second motor generator 5 is constructed by a second rotor 13 and a second stator 14.

The drive control apparatus 1 has: a first inverter 15 for operating and controlling the first motor generator 4; a second inverter 16 for operating and controlling the second motor generator 5; and control means (drive control unit: ECU) 17 coupled with the first inverter 15 and the second inverter 16.

The first inverter 15 is connected to the first stator 12 of the first motor generator 4. The second inverter 16 is connected to the second stator 14 of the second motor generator 5.

A power source terminal of each of the first inverter 15 and the second inverter 16 is connected to a battery (high-voltage battery for driving) 18. The battery 18 can supply and receive an electric power to/from the first motor generator 4 and the second motor generator 5.

The drive control apparatus 1 drives and controls the hybrid vehicle by using outputs from the internal combustion engine, the first motor generator 4, and the second motor generator 5.

The power transmission mechanism 9 is what is called a power input/output apparatus of a quadruple type and is constructed as follows. The output axis 3 of the internal combustion engine 2 and the drive axis 8 are arranged. The first motor generator 4 on the internal combustion engine 2 side and the second motor generator 5 on the drive axis 8 side are arranged. A motive power of the internal combustion engine 2, a motive power of the first motor generator 4, and a motive power of the second motor generator 5 are synthesized and output to the drive axis 8. The motive powers are transmitted and received between the internal combustion engine 2 and the first motor generator 4, second motor generator 5, and drive axis 8.

Figure 7:
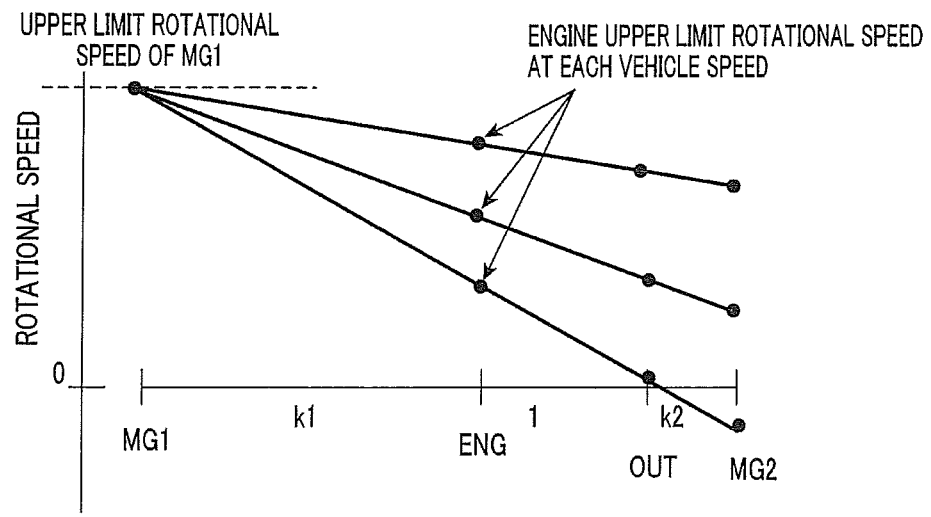
FIG. 7 is a diagram showing an engine rotational speed at every vehicle speed at the time of an upper limit rotation of the first motor generator. (Embodiment)

As shown in a collinear diagram of FIG. 7, four rotational elements of the power transmission mechanism 9 are arranged in order of the rotational element coupled with the first motor generator (MG1) 4, the rotational element coupled with the internal combustion engine (ENG) 2, the rotational element coupled with the drive axis (OUT) 8, and the rotational element coupled with the second motor generator (MG2) 5. Mutual lever ratios among those rotational elements are set to k1:1:k2 in the same order as that mentioned above. A torque correction value of the first motor generator 4 and a torque correction value of the second motor generator 5 are set so as to maintain such a relation that a value obtained by multiplying the torque correction value of the first motor generator 4 by k1 and a value obtained by multiplying the torque correction value of the second motor generator 5 by (1+k2) are equal. Thus, in the torque balance equation, in the case of constructing the similar power transmission mechanism 9 (differential gear mechanism) which has four rotational elements and whose lever ratios differ, it can be preferably used.

k1: Lever ratio between the first motor generator (MG1) and the internal combustion engine (ENG) in the case where a distance between the internal combustion engine (ENG) and the drive axis (OUT) is set to "1"

k2: Lever ratio between the drive axis (OUT) and the second motor generator (MG2) 5 in the case where a distance between the internal combustion engine (ENG) and the drive axis (OUT) is set to "1"

The power transmission mechanism 9 is constructed in such a manner that a first planetary gear mechanism 19 and a second planetary gear mechanism 20 whose two rotational elements are coupled are arranged in parallel.

The first planetary gear mechanism 19 has: a first sun gear 21; a first pinion gear 22 engaged with the first sun gear 21; a first ring gear 23 engaged with the first pinion gear 22; a first carrier 24 coupled with the first pinion gear 22; and an output gear 25 coupled with the first ring gear 23.

The second planetary gear mechanism 20 has: a second sun gear 26; a second pinion gear 27 engaged with the second sun gear 26; a second ring gear 28 engaged with the second pinion gear 27; and a second carrier 29 coupled with the second pinion gear 27.

In the power transmission mechanism 9, the first carrier 24 of the first planetary gear mechanism 19 is coupled with the output axis 3 of the internal combustion engine 2, and the second carrier 29 of the second planetary gear mechanism 20 is coupled with the first ring gear 23 and the output gear 25 of the first planetary gear mechanism 19.

The first rotor 11 of the first motor generator 4 is connected to the first sun gear 21 through a first motor output axis 30. The output axis 3 of the internal combustion engine 2 is connected to the first carrier 24 and the second sun gear 26. The drive axis 8 is connected to the first ring gear 23 and the second carrier 29 through the output gear 25 and the output transfer mechanism 7. The second rotor 13 of the second motor generator 5 is connected to the second ring gear 28 through a second motor output axis 31.

The second motor generator 5 can be directly coupled with the drive wheel 6 through the second motor output axis 31, second ring gear 28, second carrier 29, first ring gear 23, output gear 25, output transfer mechanism 7, and drive axis 8 and has performance for enabling the vehicle to run only by a single output.

That is, in the power transmission mechanism 9, the first carrier 24 of the first planetary gear mechanism 19 and the second sun gear 26 of the second planetary gear mechanism 20 are coupled and connected to the output axis 3 of the internal combustion engine 2, and the first ring gear 23 of the first planetary gear mechanism 19 and the second carrier 29 of the second planetary gear mechanism 20 are coupled and connected to the drive axis 8, the first motor generator 4 is connected to the first sun gear 21 of the first planetary gear mechanism 19, the second motor generator 5 is connected to the second ring gear 28 of the second planetary gear mechanism 20, and the motive powers are transmitted and received between the internal combustion engine 2 and the first motor generator 4, second motor generator 5, and drive axis 8.

Accelerator opening degree detecting means 32 for detecting a depression amount of an accelerator pedal as an accelerator opening degree, vehicle speed detecting means 33 for detecting a vehicle speed, battery charge state detecting means 34 for detecting a state of charge (SOC) of the battery 18, and engine rotational speed detecting means 35 for detecting an engine rotational speed are connected to the control means 17.

An air amount adjusting mechanism 36, a fuel supplying mechanism 37, and an ignition timing adjusting mechanism 38 are connected to the control means 17 so as to control the internal combustion engine 2.

Further, battery state detecting means 39 for detecting a battery state (parameters such as battery temperature, battery voltage, and the like) is connected to the control means 17.

As shown in FIGS. 1 and 2, the control means 17 has target drive force setting means 17A, target drive power setting means 17B, target charge/discharge power setting means 17C, provisional target engine power calculating means 17D, provisional target engine operation point setting means 17E, target engine operation point setting means 17F, target engine power setting means 17G, target engine power lower limit value calculating means 17H, electric power upper/lower limit value calculating means 17I, electric power loss presuming means 17J, target electric power calculating means 17K, and motor torque instruction value operating means 17L. As shown in FIG. 2, the target charge/discharge power setting means 17C and the electric power loss presuming means 17J are connected to the provisional target engine power calculating means 17D through increase/decrease operating means 17M.

The target drive force setting means 17A sets a target drive force on the basis of the accelerator opening degree detected by the accelerator opening degree detecting means 32 and the vehicle speed detected by the vehicle speed detecting means 33.

The target drive power setting means 17B sets a target drive power on the basis of the accelerator opening degree detected by the accelerator opening degree detecting means 32 and the vehicle speed detected by the vehicle speed detecting means 33.

The target charge/discharge power setting means 17C sets a target charge/discharge power on the basis of at least a charge state of the battery detected by the battery charge state detecting means 34.

The provisional target engine power calculating means 17D calculates a provisional target engine power from the target drive power set by the target drive power setting means 17B and the target charge/discharge power set by the target charge/discharge power setting means 17C.

The provisional target engine operation point setting means 17E sets a provisional target engine operation point for deciding a provisional target engine rotational speed and a provisional target engine torque from the provisional target engine power calculated by the provisional target engine power calculating means 17D and a retrieval map M.

The target engine operation point setting means 17F sets a target engine operation point for deciding the target engine rotational speed and the target engine torque on the basis of the vehicle speed detected by the vehicle speed detecting means 33 and the provisional target engine rotational speed and the provisional target engine torque calculated by the provisional target engine operation point setting means 17E.

The target engine power setting means 17G calculates a target engine power from the target engine operation point set by the target engine operation point setting means 17F.

The target engine power lower limit value calculating means 17H calculates a target engine power lower limit value on the basis of the accelerator opening degree or the target drive force which is calculated from the accelerator opening degree.

The electric power upper/lower limit value calculating means 17I sets an electric power upper limit value and an electric power lower limit value for restricting an input/output electric power to/from the battery 18 on the basis of the battery state detected by the battery state detecting means 39.

The electric power loss presuming means 17J calculates a presumption power serving as an electric power loss on the basis of the vehicle speed and the target drive force.

The target electric power calculating means 17K calculates a target electric power from a difference between the target engine power and the target drive power which are calculated on the basis of the provisional target engine operation point.

The motor torque instruction value operating means 17L sets a torque instruction value of each of the plurality of motor generators 4 and 5 on the basis of the provisional target engine operation point set by the provisional target engine operation point setting means 17E, and calculates a torque instruction value of each of the plurality of motor generators 4 and 5 by using a torque balance equation including the target engine torque which is obtained from the target engine operation point and an electric power balance equation including the target electric power.

Specifically speaking, each of the above means in the control means 17 has the following function.

The provisional target engine power calculating means 17D compares the provisional target engine power which is calculated from the target drive power set by the target drive power setting means 17B and the target charge/discharge power set by the target charge/discharge power setting means 17C with the target engine power lower limit value. When the provisional target engine power is smaller than the target engine power lower limit value, the means 17D sets the target engine power lower limit value to the provisional target engine power and outputs the provisional target engine power.

The provisional target engine power calculating means 17D finally calculates the provisional target engine power on the basis of the accelerator opening degree, inputs the target engine power lower limit value from the target engine power lower limit value calculating means 17H, and compares magnitudes of the provisional target engine power and the target engine power lower limit value. When the provisional target engine power is equal to or larger than the target engine power lower limit value, the provisional target engine power is held, and when the provisional target engine power is smaller than the target engine power lower limit value, the target engine power lower limit value is set to the provisional target engine power, thereby correcting the target engine power lower limit value so as to be restricted on the basis of the electric power lower limit value.

Further, the provisional target engine power calculating means 17D fundamentally calculates the provisional target engine power on the basis of the target drive power, the target charge/discharge power, and the presumption power serving as an electric power loss, and restricts by the target engine power lower limit value from the target engine power lower limit value calculating means 17H. The provisional target engine power is decided in consideration of the electric power loss. Although the target engine power lower limit value is also decided in consideration of the electric power loss, since the target engine power lower limit value is a restriction value to which the battery state is reflected, a wasteful double calculation is not performed.

Furthermore, the target engine power maximum value corresponding to a state where the target drive power has received the power assistance depending on the electric power of the battery 18 is preset and provided in the provisional target engine power calculating means 17D. The provisional target engine power calculating means 17D compares the provisional target engine power calculated from the target drive power set by the target drive power setting means 17B and the target charge/discharge power set by the target charge/discharge power setting means 17C with the target engine power maximum value, and updates a smaller one of those values as a provisional target engine power. Thus, while controlling the engine operation point so as to be matched with the target value, the state of charge (SOC) of the battery 18 can be set to a value within a predetermined range and a power assistant region using the electric power of the battery 18 can be provided. The driving using the electric power of the battery 18 can be performed by using the power assistant region in accordance with a request of the driver. The plurality of motor generators 4 and 5 in the case where there is a charge/discharge to/from the battery 18 can be controlled.

When the provisional target engine operation point is not restricted by the upper limit rotational speed or the like, the provisional target engine operation point setting means 17E sets the provisional target engine operation point to the target engine operation point as it is. Therefore, the provisional target engine operation point setting means 17E can be also constructed as target engine operation point setting means 17F. That is, although the provisional target engine operation point setting means 17E has been described separately from the target engine operation point setting means 17F for convenience of explanation, the provisional target engine operation point setting means 17E may be used as target engine operation point setting means 17F.

The target engine power lower limit value calculating means 17H corrects the target engine power lower limit value so as to restrict it on the basis of the electric power lower limit value and outputs the target engine power lower limit value to the provisional target engine power calculating means 17D.

The target engine power lower limit value calculating means 17H also corrects the electric power lower limit value by using the presumption power serving as an electric power loss, corrects the target engine power lower limit value so as to restrict it on the basis of the corrected electric power lower limit value, and outputs the target engine power lower limit value to the provisional target engine power calculating means 17D.

Figure 8:
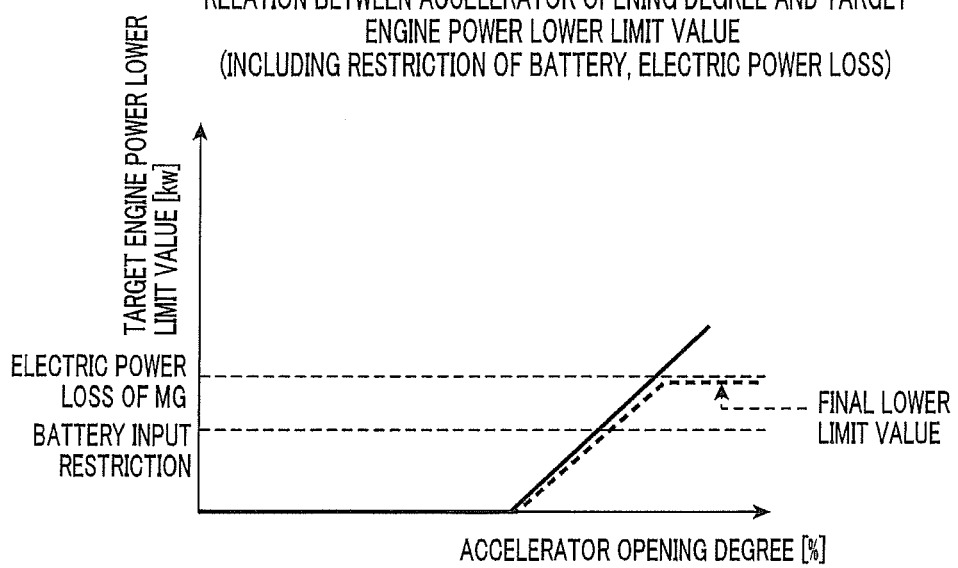
FIG. 8 is a diagram showing a relation between an accelerator opening degree and a target engine power. (Embodiment)

Further, in the fundamental case where the correction of the electric power lower limit value or the like depending on the battery state is unnecessary, the target engine power lower limit value calculating means 17H calculates the target engine power lower limit value on the basis of the accelerator opening degree to which an intent of the driver is reflected (refer to FIG. 8).

Furthermore, the target engine power lower limit value calculating means 17H inputs the electric power lower limit value which is an output from the electric power upper/lower limit value calculating means 17I and which has been calculated so as to restrict the input/output of the battery 18, and compares magnitudes of an absolute value (inverse encoding)

of the electric power lower limit value and the target engine power lower limit value. When the target engine power lower limit value is equal to or larger than the absolute value of the electric power lower limit value, the target engine power lower limit value is held. When the target engine power lower limit value is smaller than the absolute value of the electric power lower limit value, the absolute value of the electric power lower limit value is set to the target engine power lower limit value. The final target engine power lower limit value is output to the provisional target engine power calculating means 17D. In this case, the target engine power lower limit value calculating means 17H corrects the target engine power lower limit value so as to restrict it on the basis of the electric power lower limit value. It is also possible to construct as mentioned above by arithmetically operating by a different process without allowing the electric power loss to be included in the calculations (refer to FIGS. 9 to 11).

The target engine power lower limit value calculating means 17H also inputs the presumption power serving as an electric power loss, and compares magnitudes of an absolute value (inverse encoding) of the electric power lower limit value which has been corrected so as to exclude the presumption power from the electric power lower limit value and the target engine power lower limit value. When the target engine power lower limit value is equal to or larger than the absolute value of the electric power lower limit value, the target engine power lower limit value is held. When the target engine power lower limit value is smaller than the absolute value of the electric power lower limit value, the absolute value of the electric power lower limit value is set to the target engine power lower limit value. The final target engine power lower limit value is output to the provisional target engine power calculating means 17D. In this case, the target engine power lower limit value calculating means 17H corrects the electric power lower limit value by using the presumption power serving as an electric power loss and corrects the target engine power lower limit value so as to restrict it on the basis of the corrected electric power lower limit value (refer to FIG. 12).

Further, although the target engine power lower limit value calculating means 17H is constructed so as to calculate the target engine power lower limit value on the basis of the accelerator opening degree, it is also possible to construct so as to calculate the target engine power lower limit value on the basis of the target drive force which is calculated on the basis of the accelerator opening degree. In any of those cases, those constructions are common with respect to a point that the drive force which is requested by the driver is reflected on the basis of the accelerator opening degree.

Figure 10:
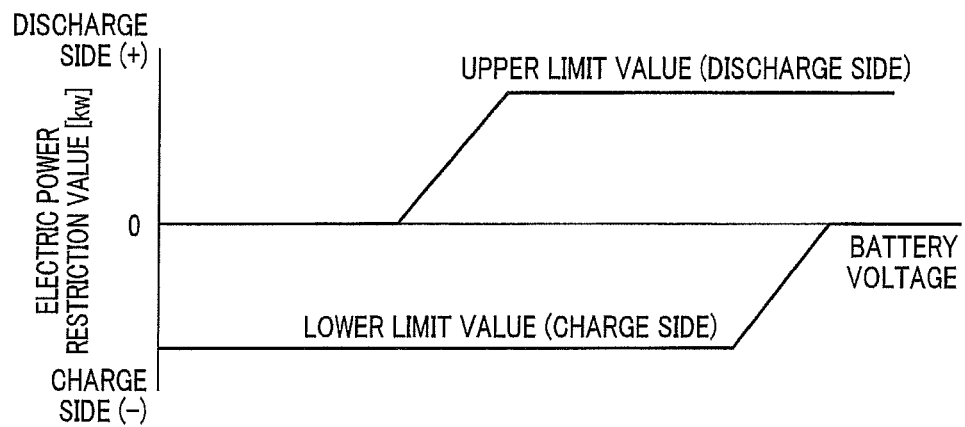
FIG. 10 is a diagram showing an electric power upper/lower limit restriction value retrieval table according to a battery voltage. (Embodiment)
Figure 11:
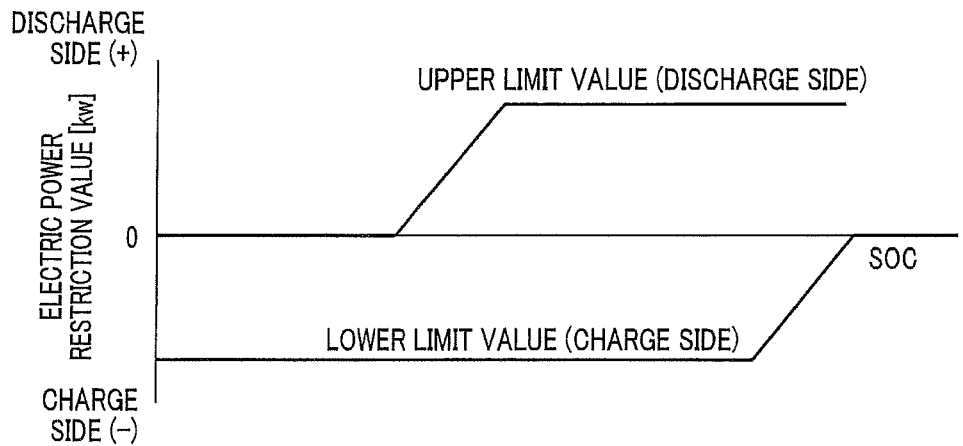
FIG. 11 is a diagram showing an electric power upper/lower limit restriction value retrieval table according to a state of charge (SOC). (Embodiment)

The electric power upper/lower limit value calculating means 17I has: a table which specifies an electric power upper limit value and an electric power lower limit value for the battery temperature (refer to FIG. 9); a table which specifies an electric power upper limit value and an electric power lower limit value for the battery voltage (refer to FIG. 10); and a table which specifies an electric power upper limit value and an electric power lower limit value for the charge state (SOC) of the battery 18 (refer to FIG. 11). The battery temperature, the battery voltage, and the charge state (SOC) serving as a battery state are input. The electric power upper limit value and the electric power lower limit value which have been specified on the basis of the battery temperature which was input, the electric power upper limit value and the electric power lower limit value which have been specified on the basis of the battery voltage which was input, the electric power upper limit value and the electric power lower limit value which have been specified on the basis of the charge state (SOC) which was input are obtained. The presumption power serving as an electric power loss is subtracted from them. The resultant electric power upper limit values are compared and the resultant electric power lower limit values are compared, respectively. The electric power upper limit value and the electric power lower limit value of the largest restriction are output to the target electric power calculating means 17K, respectively. Thus, by restricting to the input/output power according to the battery state, the overvoltage of the battery 18 in the charge/discharge can be protected and the overdischarge and the overcharge can be prevented in consideration of the charge state (SOC).

Figure 12:
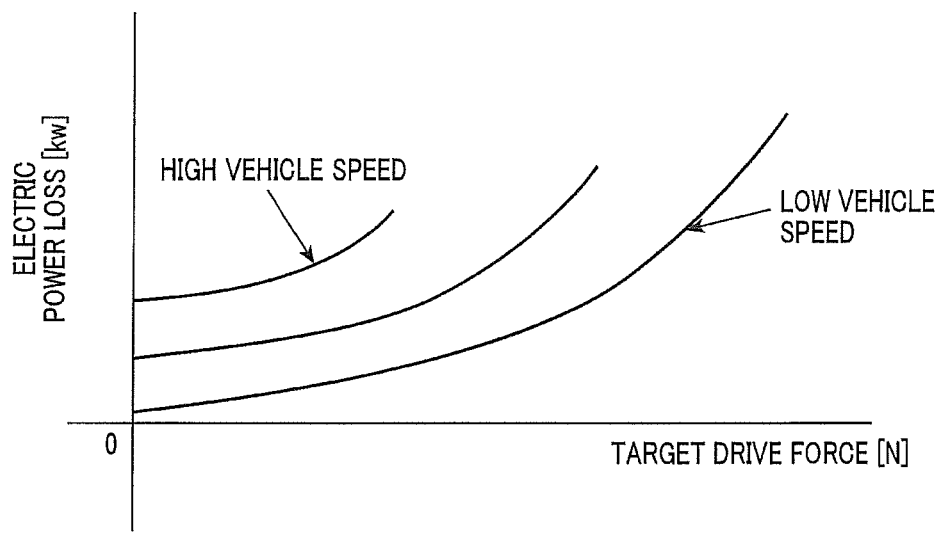
FIG. 12 is a diagram showing an electric power loss retrieval map. (Embodiment)
Figure 13:
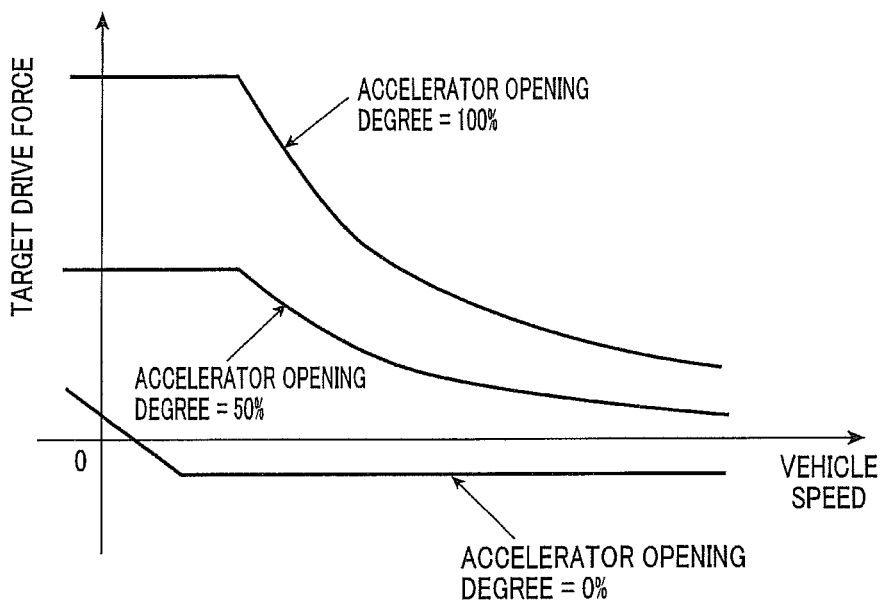
FIG. 13 is a diagram showing a target drive force retrieval map. (Embodiment)

The electric power loss presuming means 17J has a retrieval map (refer to FIG. 12) in which the presumption power serving as an electric power loss has been set. As shown in FIG. 12, the presumption power serving as an electric power loss increases with an increase in target drive force and its increase rate increases with an increase in target drive force. The presumption power serving as an electric power loss increases with an increase in vehicle speed and the target drive force having its maximum value decreases with an increase in vehicle speed.

The target electric power calculating means 17K can be constructed so as to restrict to the electric power upper limit value or the electric power lower limit value when the target electric power is out of a range where the target electric power is set by the electric power upper limit value or the electric power lower limit value.

When the feedback correction of the torques is performed, the motor torque instruction value operating means 17L calculates a torque correction value of the first motor generator 4 and a torque correction value of the second motor generator 5 among the plurality of motor generators on the basis of a deviation between the actual engine rotational speed and the target engine rotational speed, and sets a ratio between the torque correction value of the first motor generator 4 and the torque correction value of the second motor generator 5 so as to become a predetermined ratio based on the lever ratio of the power transmission mechanism 9. Thus, since the torque deviation of the internal combustion engine 2 is cancelled by using a torque balance equation in which an attention is paid to a torque change by using the drive axis 8 as a fulcrum, it is possible to construct in such a manner that even if the torque deviation occurred in the internal combustion engine 2, it does not exert an influence on the torque of the drive axis 8.

The motor torque instruction value operating means 17L also calculates the torque instruction value of each of the first motor generator 4 and the second motor generator 5 by using a torque balance equation including the target engine torque which is obtained from the target engine operation point and an electric power balance equation including the target electric power, and enables the feedback correction to be performed to the torque correction value of each of the first motor generator 4 and the second motor generator 5 so as to converge the actual engine rotational speed to the target engine rotational speed which is obtained from the target engine operation point.

That is, in the embodiment, in the hybrid vehicle for synthesizing the output of the internal combustion engine 2 and the motive powers of the first motor generator 4 and the second motor generator 5 and driving the drive axis 8 connected to the drive wheel 6: the value of the drive force obtained by adding the force of the power assistance by the electric power is preset as a maximum value of the target drive force; the target drive power is obtained from the target drive force in which the accelerator opening degree and the vehicle speed are used as parameters and from the vehicle speed; the lower limit of the target engine power is restricted in accordance with the target drive force or the accelerator opening degree; the lower limit value is restricted in accordance with the input restriction of the battery 18 and the electric power loss of the first motor generator 4 and the second motor generator 5; the target charge/discharge power is obtained on the basis of the charge state (SOC) of the battery 18 and added to the target drive power and a resultant value is obtained as a provisional target engine power; the provisional target engine operation point is obtained from the provisional target engine power; when the engine rotational speed at the provisional target engine operation point exceeds an upper limit of the engine rotational speed which is calculated on the basis of the vehicle speed, the engine rotational speed at the engine operation point is changed to the upper limit value; the torque at the engine operation point is changed to a value corresponding to the engine rotational speed after the change and is set to the target engine operation point; the target engine power is calculated from the target engine operation point; the target electric power as a target value of the input/output electric power to/from the battery 18 is obtained from the difference between the target drive power and the target engine power; and the torque instruction values of the first motor generator 4 and the second motor generator 5 are arithmetically operated by the torque balance equation including the target engine torque and the electric power balance equation including the target electric power.

Thus, the control of the plurality of motor generators 4 and 5 in the case where there is a charge/discharge to/from the battery 18 can be performed. Both of an assurance of the target drive force and an assurance of the target charge/discharge can be realized in consideration of the operation point (engine operation point) of the internal combustion engine 2. Further, by finely correcting the torque instruction value of each of the plurality of motor generators 4 and 5, the engine rotational speed can be rapidly converged to the target value. Further, since the engine operation point can be matched with the target operation point, the vehicle can be set to the proper driving state.

As control of the plurality of motor generators 4 and 5 in the case where there is a charge/discharge to/from the battery 18 in the hybrid vehicle having the internal combustion engine 2 and the plurality of motor generators 4 and 5, in the case of performing the control for realizing both of the assurance of the target drive force and the assurance of the target charge/discharge in consideration of the operation point (engine operation point) of the internal combustion engine 2, the torque fluctuation of the internal combustion engine 2 is optimized so as not to exert an influence on the drive torque, thereby enabling a drivability and a running feeling to be improved.

Further, both of an assurance of the target drive forces in the plurality of motor generators 4 and 5 and an assurance of a charge/discharge near the target charge/discharge in which the overdischarge for the battery 18 has been prevented can be realized in consideration of the operation point (engine operation point) of the internal combustion engine 2. After the target engine rotational speed was reset so as not to exceed the upper limit value of the target engine rotational speed, a target electric power different from the target charge/discharge power is set on the basis of it. The drive forces of the plurality of motor generators 4 and 5 are set on the basis of the optimized target engine operation point and the optimum target electric power in which the overdischarge has been prevented. Therefore, the engine rotational speed is restricted, the internal combustion engine 2 is protected, and the drive force which is requested by the driver can be satisfied by the power assistance using the electric power of the battery 18.

In the control means 17 according to the embodiment, as shown in FIG. 7, the engine rotational speed at the time of the upper limit rotation of the first motor generator 4 is set every vehicle speed.

Subsequently, in the embodiment, the arithmetic operations for obtaining the target engine operation point (target engine rotational speed, target engine torque) and the target electric power from the accelerator opening degree and the vehicle speed will be described on the basis of a control block diagram of FIG. 2 and flowcharts of FIGS. 4 and 5.

Figure 4:
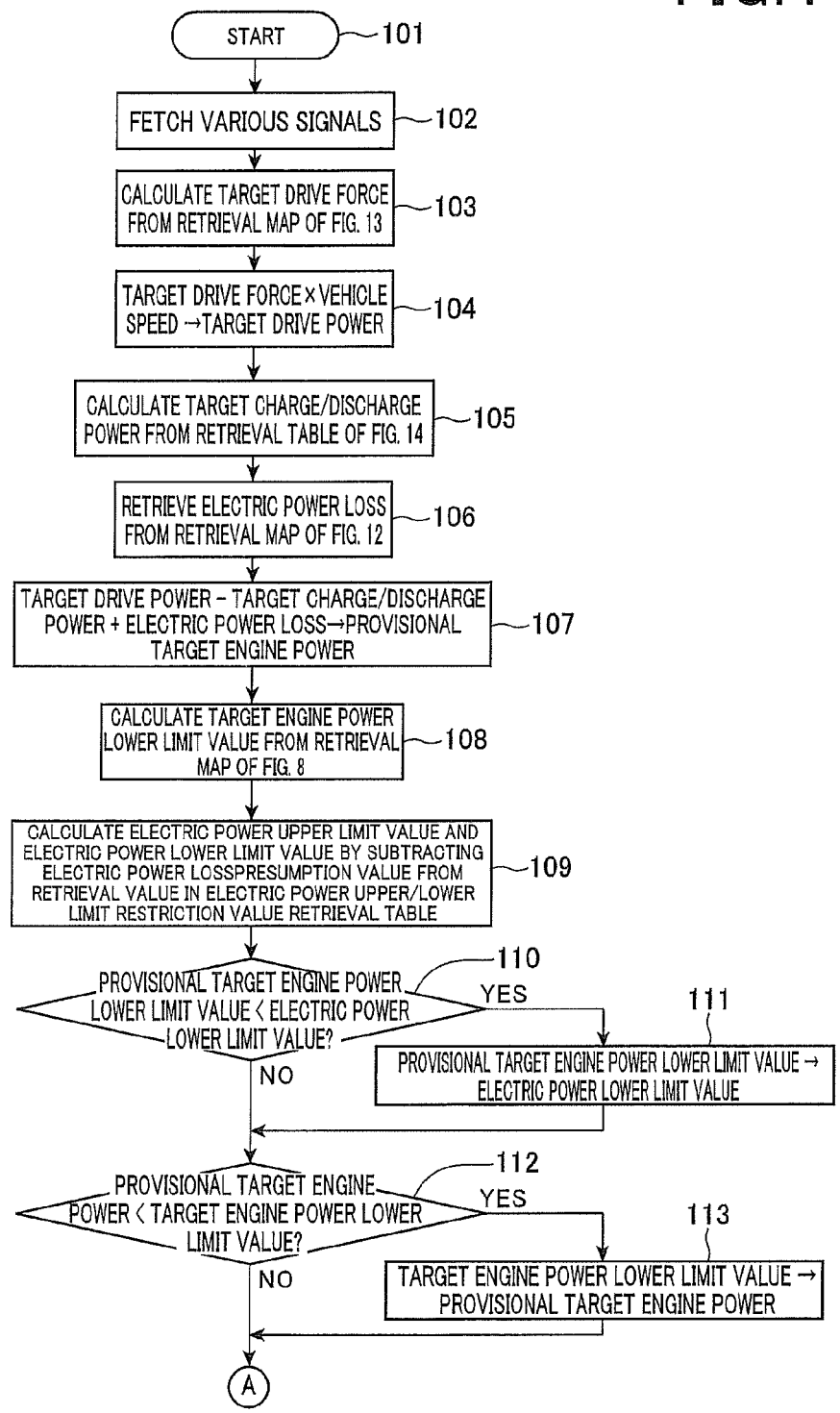
FIG. 4 is a flowchart for calculating a target engine operation point and a target electric power. (Embodiment)

As shown in FIG. 4, when a program of the control means 17 is started (step 101), first, various kinds of signals (accelerator opening degree, vehicle speed, charge state (SOC)) which are used for control and a battery state (parameters such as battery temperature, battery voltage, and the like) are fetched (step 102). A target drive force according to the accelerator opening degree and the vehicle speed is calculated from a target drive force retrieval map shown in FIG. 13 (step 103). In this case, a high vehicle speed region where the accelerator opening degree is equal to zero (0) is set to a negative value so as to obtain a drive power in the decelerating direction corresponding to an engine brake. On the other hand, in a region where the vehicle speed is low, it is set to a positive value so that a creep run can be performed.

By multiplying the target drive force and the vehicle speed, a target drive power necessary to drive the vehicle by the target drive force is set (step 104).

Figure 14:
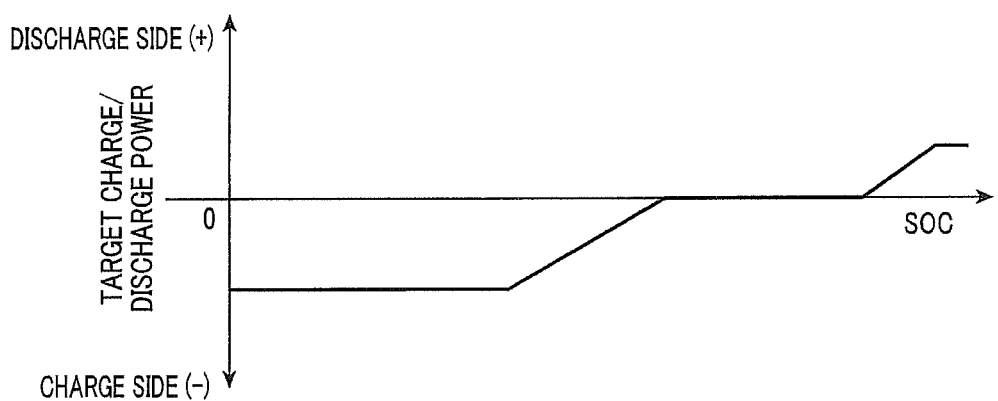
FIG. 14 is a diagram showing a target charge/discharge power retrieval table. (Embodiment)

Further, in order to control the charge state (SOC) of the battery 18 so as to lie within a normal use range, the target charge/discharge power is calculated from a target charge/discharge amount retrieval table shown in FIG. 14 (step 105). In this case, when the charge state (SOC) of the battery 18 is low, by increasing the charge power, an overdischarge of the battery 18 is prevented. When the charge state (SOC) of the battery 18 is high, by increasing the discharge power, an overcharge is prevented. For convenience of explanation, the discharge side is handled as a positive value and the charge side is handled as a negative value.

The presumption power serving as an electric power loss in the first motor generator 4 and the second motor generator 5 is retrieved from an electric power loss retrieval map shown in FIG. 12 (step 106). Since this point of time is timing when the operation points of the first motor generator 4 and the second motor generator 5 are decided, the electric power loss cannot be calculated from the electric power loss retrieval map shown in FIG. 12 of the first motor generator 4 and the second motor generator 5. Therefore, an approximate value of the electric power loss is preset by using the vehicle speed and the target drive force as parameters and the electric power loss is calculated by the retrieval.

A provisional target engine power serving as a power to be output by the internal combustion engine 2 is calculated from the target drive power, the target charge/discharge power, and the presumption power serving as an electric power loss (step 107). The provisional target engine power to be output by the internal combustion engine is equal to a value obtained by adding the power adapted to charge the battery 18 to the power necessary to drive the vehicle (in the case of discharge, subtracting). Since the charge side is handled as a negative value here, the provisional target engine power is calculated by subtracting the target charge/discharge power from the target drive power.

After that, in accordance with the target drive force or the accelerator opening degree, as shown in FIG. 8, a preset target engine power lower limit value is calculated from the relation between the accelerator opening degree and the target engine power (step 108). As an example, the relation between the target engine power lower limit value and the accelerator opening degree is shown by a solid line in FIG. 8.

Figure 9:
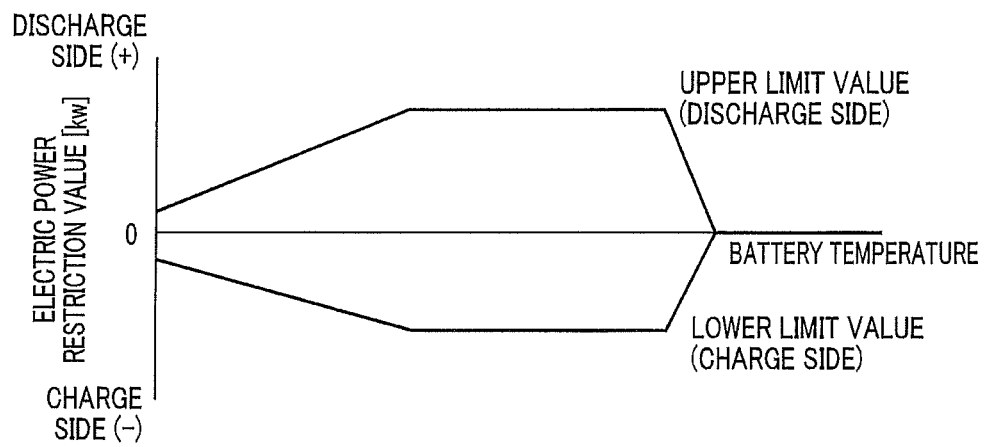
FIG. 9 is a diagram showing an electric power upper/lower limit restriction value retrieval table according to a battery temperature. (Embodiment)

An electric power upper limit value and an electric power lower limit value are calculated from the electric power upper/lower limit restriction value retrieval tables shown in FIGS. 9 to 11 (step 109). In the retrieval tables in FIGS. 9 to 11, the discharge side is handled as a positive value, the charge side is handled as a negative value, the minimum value on the discharge side among the values calculated from the retrieval tables is calculated as an electric power upper limit value, and the value in which the absolute value on the charge side becomes minimum is calculated as an electric power lower limit value.

FIG. 10 shows an example of the restriction by the battery temperature. When the battery temperature is low, since a response speed of the battery 18 decreases, the electric power which can be charged/discharged decreases. When the battery temperature is high, it is necessary to restrict the charge/discharge electric power in order to prevent a temperature increase.

FIG. 11 shows an example of the restriction by the battery voltage. An upper limit voltage and a lower limit voltage are provided for the battery 18 for the purpose of protection. If the battery is used in excess of such a range, a deterioration of the battery 18 progresses. It is, therefore, necessary to restrict the charge when the voltage is high and to restrict the discharge when the voltage is low.

FIG. 12 shows an example of the restriction by the state of charge (SOC) of the battery 18. It is necessary to avoid the charge state (SOC) of the battery 18 from becoming the overdischarge or overcharge. It is necessary to restrict the discharge when the charge state (SOC) is low and to restrict the charge when the charge state (SOC) is high.

Whether or not the provisional target engine power lower limit value is less than the electric power lower limit value is discriminated (step 110).

If this step 110 is YES and the provisional target engine power lower limit value is less than the electric power lower limit value, the provisional target engine power lower limit value is restricted to the electric power lower limit value (step 111) (refer to "final lower limit value" in FIG. 8).

If step 110 is NO or after the process of step 111, whether or not the provisional target engine power is less than the provisional target engine power lower limit value is discriminated (step 112).

If this step 112 is YES, the provisional target engine power is restricted to the provisional target engine power lower limit value (step 113).

Subsequently, the arithmetic operations of the target engine operation point and the target electric power will be described with reference to the flowchart of FIG. 5.

Figure 5:
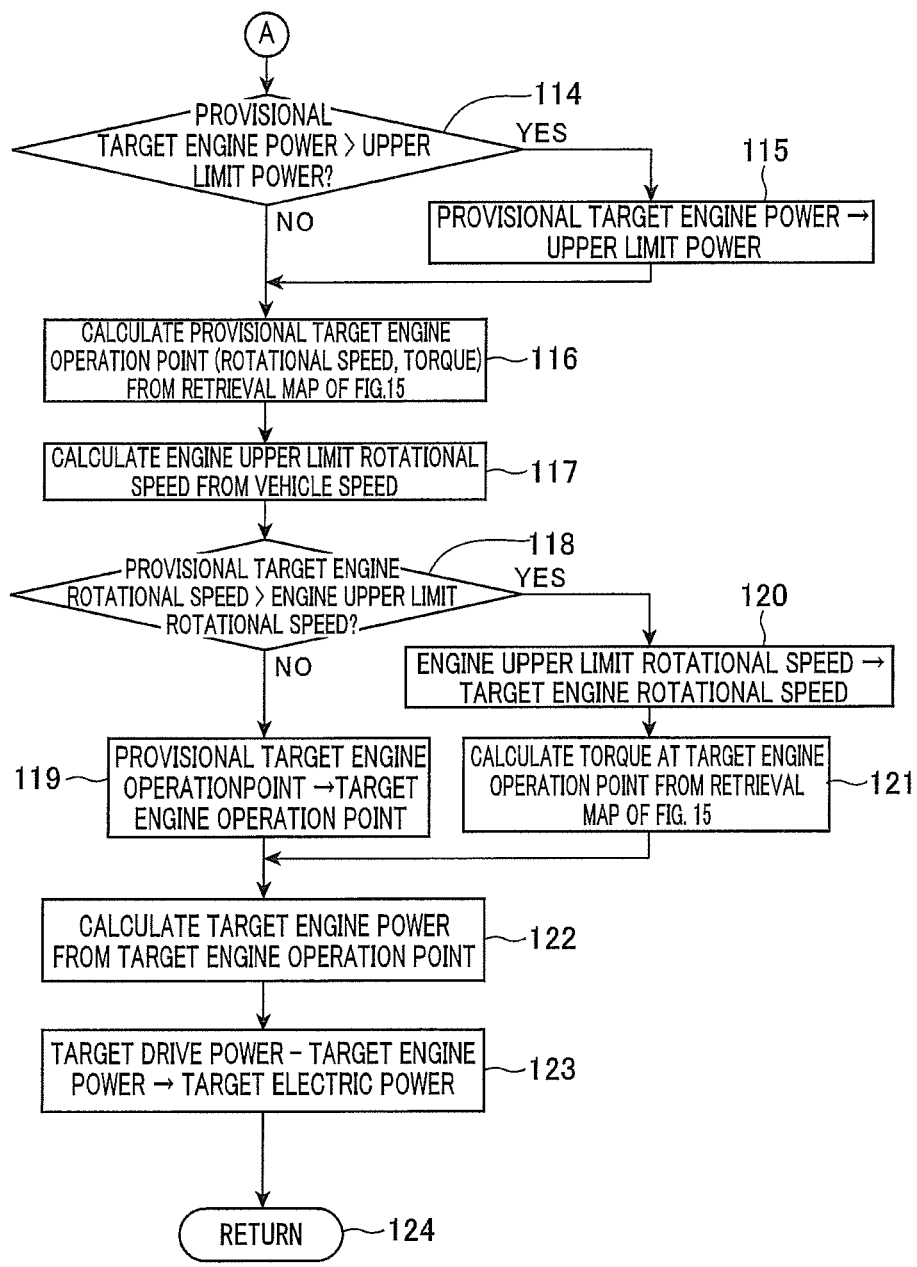
FIG. 5 is a flowchart for calculating a target engine operation point and a target electric power in sequel to FIG. 4. (Embodiment)

As shown in FIG. 5, if step 112 in the flowchart of FIG. 4 is NO or after the process of step 113, whether or not the provisional target engine power is larger than the upper limit power is discriminated (step 114). The upper limit power is a maximum value which can be output by the internal combustion engine 2.

If this step 114 is YES, the provisional target engine power is restricted to the upper limit power and an upper limit guard is performed (step 115).

Figure 15:
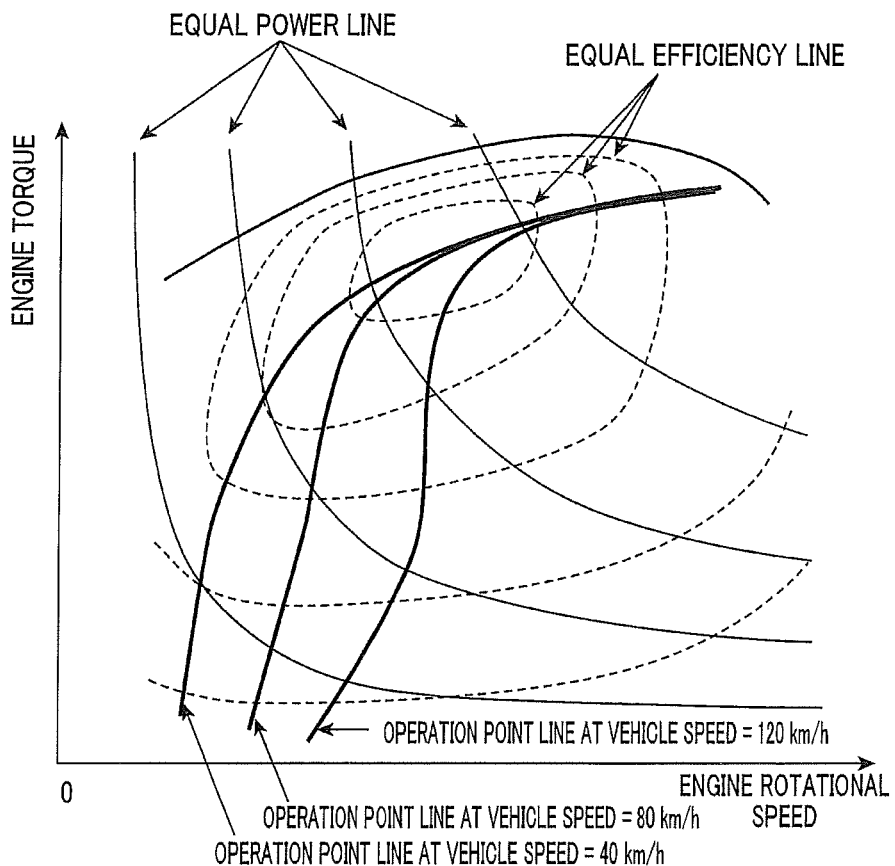
FIG. 15 is a diagram showing a target operation point retrieval map. (Embodiment)

If this step 114 is NO or after the process of step 115, a provisional target engine operation point according to the provisional target engine power and the vehicle speed is calculated from a target engine operation point retrieval map shown in FIG. 15 (step 116).

As shown in FIG. 15, in the foregoing target engine operation point retrieval map, a point where the whole efficiency obtained by adding the efficiency of the power transmission system constructed by the power transmission mechanism 9, first motor generator 4, and second motor generator 5 to the efficiency of the internal combustion engine 2 is improved is selected every power on an equal power line and a line obtained by connecting the selected points is set as a target operation point line. The target operation point line is set every vehicle speed. Those setting values may be experimentally obtained or may be obtained by calculations from the efficiencies of the internal combustion engine 2, first motor generator 4, and second motor generator 5.

The target operation point line is set in such a manner that as the vehicle speed rises, it is shifted to the high rotation side. This is because of the following reasons.

Figure 16:
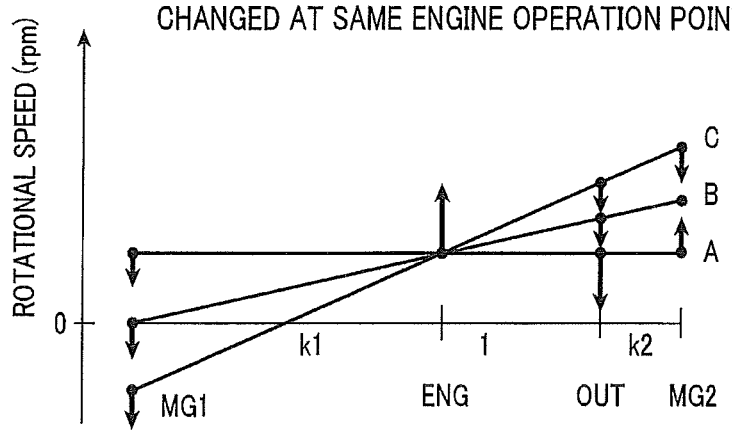
FIG. 16 is a collinear diagram in the case where a vehicle is changed at the same engine operation point. (Embodiment)

In the case where the same engine operation point is set to the target engine operation point irrespective of the vehicle speed, as shown in FIG. 16, when the vehicle speed is low, the rotational speed of the first motor generator 4 is positive, the first motor generator 4 becomes a generator, and the second motor generator 5 becomes an electric motor (state of A in FIG. 16). As the vehicle speed rises, the rotational speed of the first motor generator 4 approaches zero (0) (state of B in FIG. 16). When the vehicle speed further rises, the rotational speed of the first motor generator 4 becomes negative. In this state, the first motor generator 4 operates as an electric motor and the second motor generator 5 operates as a generator (state of C in FIG. 16).

When the vehicle speed is low (state of A and state of B in FIG. 16), since a circulation of the power does not occur, the target operation point approaches a point where the engine efficiency is almost good like a target operation point line of the vehicle speed=40 km/h shown in FIG. 15.

However, when the vehicle speed is high (state of C in FIG. 16), since the first motor generator 4 operates as an electric motor, the second motor generator 5 operates as a generator, and the power circulation occurs, the efficiency of the power transmission system deteriorates.

Figure 17:
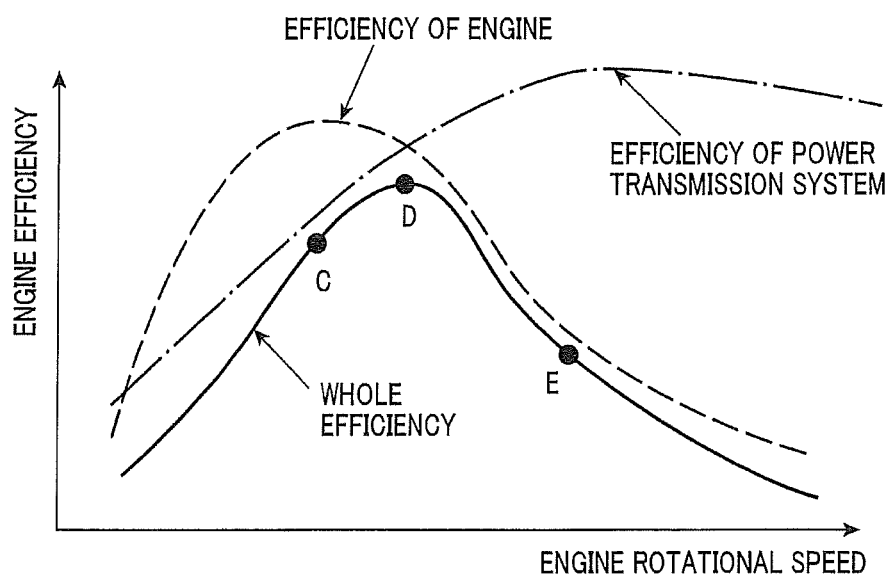
FIG. 17 is a diagram showing each efficiency state on an equal power line. (Embodiment)

Therefore, as shown at point C in FIG. 17, even if the engine efficiency is good, the efficiency of the power transmission system deteriorates, so that the whole efficiency deteriorates.

Figure 18:
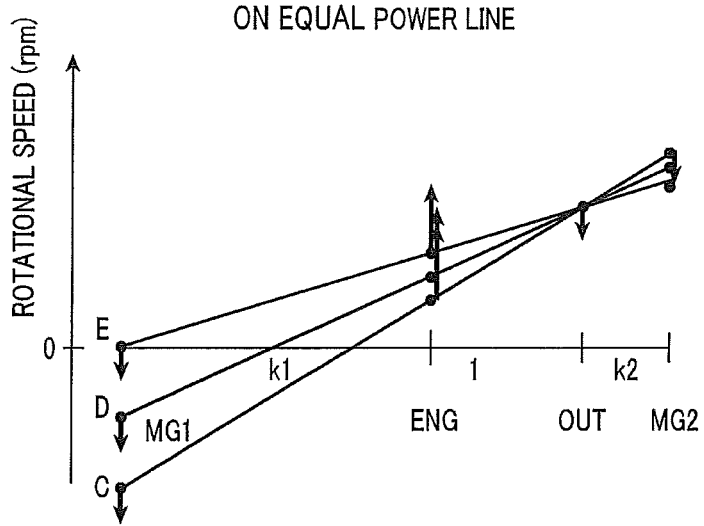
FIG. 18 is a collinear diagram showing each point (D, E, F) on an equal power line. (Embodiment)

Therefore, in order to prevent the power circulation from occurring in the high vehicle speed range, it is sufficient to set the rotational speed of the first motor generator 4 to zero (0) or higher as shown at point E in a collinear diagram shown in FIG. 18. However, if it is set as mentioned above, the engine operation point is shifted to such a direction that the engine rotational speed rises. Therefore, as shown at point E in FIG. 17, even if the efficiency of the power transmission system becomes good, since the engine efficiency deteriorates largely, the whole efficiency deteriorates.

Therefore, as shown in FIG. 17, a point where the whole engine efficiency is good is point D between them. If such point D is set to the target engine operation point, the driving of the highest efficiency can be performed.

The three operation points of point C, point D, and point E mentioned above are plotted onto the target operation point retrieval map, so that a map as shown in FIG. 19 is obtained. In FIG. 19, naturally, the engine operation point where the whole efficiency becomes best when the vehicle speed is high is shifted to the higher rotation side than that at the operation point where the engine efficiency becomes best.

An engine upper limit rotational speed is calculated from the vehicle speed (step 117). As shown in FIG. 7, the upper limit rotational speed of the internal combustion engine 2 is restricted by the upper limit rotational speed of the first motor generator 4 and its value becomes a value according to the vehicle speed (rotational speed of the drive axis 8).

Whether or not the provisional target engine rotational speed is higher than the engine upper limit rotational speed is discriminated (step 118).

If this step 118 is NO, the provisional target engine operation point (provisional target engine rotational speed and provisional target engine torque) is set to the target engine operation point (target engine rotational speed and target engine torque) as it is (step 119).

On the other hand, if this step 118 is YES, the engine upper limit rotational speed is used as a target engine rotational speed (step 120). A target engine torque at the target engine rotational speed is calculated from the target operation point retrieval map of FIG. 15 (step 121).

After the process of step 119 mentioned above or after the process of step 121, a target engine power is calculated from the target engine operation point (target engine rotational speed and target engine torque) (step 122). When the provisional target engine rotational speed exceeds the engine upper limit rotational speed, the foregoing calculated target engine power is set to a value smaller than the calculated provisional target engine power, that is, a value which can be actually output.

The target engine power is subtracted from the target drive power and the target electric power is calculated (step 123). In this case, when the target drive power is larger than the target engine power, the target electric power is set to a value which denotes an assistance power by the battery electric power. When the target engine power is larger than the target drive power, the target electric power is set to a value which denotes a charge electric power to the battery 18. Since the target engine power is equal to a value which can be actually output, if the power assistance is performed by the target electric power which was calculated here, the drive force which is required by the driver can be obtained.

The program is returned (step 124).

Subsequently, arithmetic operations of the target torques of the first motor generator 4 and the second motor generator 5 to set the charge/discharge amount of the battery 18 to the target value while outputting the target drive force will be described on the basis of the control block diagram of FIG. 3 and the flowchart of FIG. 6.

Figure 6:
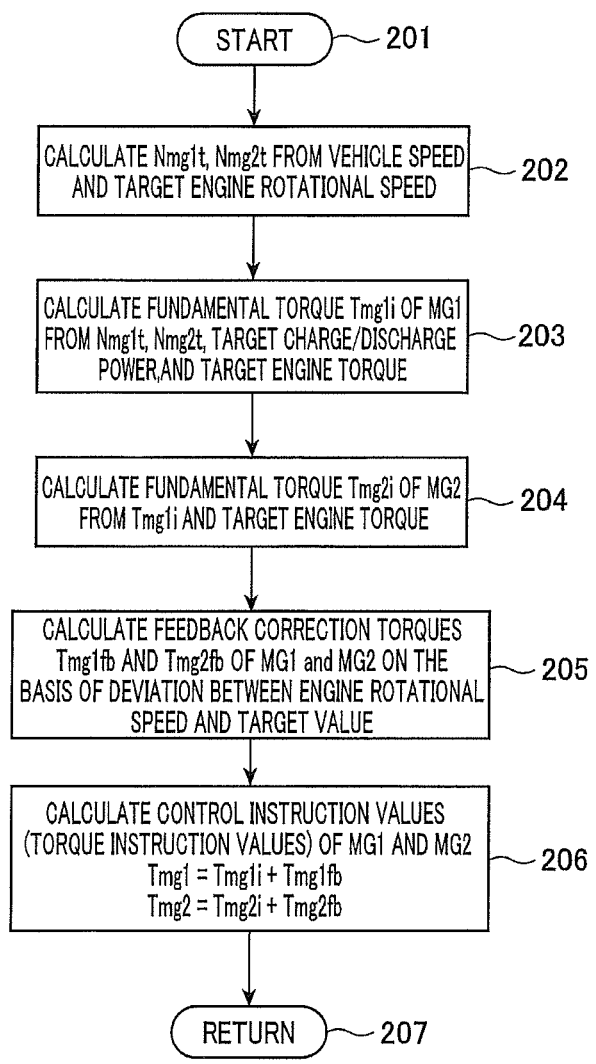
FIG. 6 is a flowchart for calculating a torque instruction value. (Embodiment)

As shown in FIG. 6, when the program of the control means 17 is started (step 201), first, rotational speeds No of the first planetary gear mechanism 19 and the second planetary gear mechanism 20 are calculated from the vehicle speed and a target rotational speed Nmg1t of the first motor generator 4 and a target rotational speed Nmg2t of the second motor generator 5 in the case where the engine rotational speed has reached a target engine rotational speed Net are calculated (step 202). The rotational speed Nmg1t of the first motor generator 4 and the rotational speed Nmg2t of the second motor generator 5 are calculated by the following (equation 1) and (equation 2). These arithmetic operation equations are obtained from a relation between the rotational speeds of the first planetary gear mechanism 19 and the second planetary gear mechanism 20.

$$Nmg1t = (Net - No)*k1 + Net \quad \text{(equation 1)}$$

$$Nmg2t = (No - Net)*k2 + No \quad \text{(equation 2)}$$

In the above (equation 1) and (equation 2), as shown in FIG. 7, k1: Lever ratio between the first motor generator (MG1) and the engine (ENG) in the case where a distance between the engine (ENG) and the drive axis (OUT) is set to "1"

k2: Lever ratio between the drive axis (OUT) and the second motor generator (MG2) in the case where a distance between the engine (ENG) and the drive axis (OUT) is set to "1"

That is, k1 and k2 are values which are decided by a gear ratio of the first planetary gear mechanism 19 and the second planetary gear mechanism 20.

A fundamental torque Tmg1i of the first motor generator 4 is calculated from the rotational speed Nmg1t of the first motor generator 4, the rotational speed Nmg2t of the second motor generator 5, a target charge/discharge power Pbatt, and a target engine torque Tet (step 203). The fundamental torque Tmg1i is calculated by the following calculation equation (3).

$$Tmg1i = (Pbatt*60/2\pi - Nmg2t*Tet/k2)/(Nmg1t + Nmg2t*(1+k1)/k2) \quad \text{(equation 3)}$$

This equation (3) can be obtained by solving simultaneous equations of the following (torque balance equation) (shown by the following "equation (4)") showing a balance of the torques which are input to the first planetary gear mechanism 19 and the second planetary gear mechanism 20 and the following (electric power balance equation) (shown by the following "equation (5)") showing that the electric power which is generated or consumed by the first motor generator 4 and the second motor generator 5 and an input/output electric power (Pbatt) to/from the battery 18 are equal.

$$Tet + (1+k1)*Tmg1 = k2*Tmg2 \quad \text{(equation 4)}$$

In the torque balance equation, as shown by the above (equation 4), the target torques and the target engine torques of the first motor generator 4 and the second motor generator 5 are balanced on the basis of a lever ratio based on a gear ratio of the power transmission mechanism 9 for mechanically and operationally coupling the first motor generator 4, second motor generator 5, and internal combustion engine 2.

$$Nmg1*Tmg1*2\pi/60 + Nmg2*Tmg2*2\pi/60 = Pbatt \quad \text{(equation 5)}$$

Subsequently, a fundamental torque Tmg2i of the second motor generator 5 is calculated from the fundamental torque Tmg1i and the target engine torque by the following (equation 6) (step 204).

$$Tmg2i = (Tet + (1+k1)*Tmg1i)/k2 \quad \text{(equation 6)}$$

This (equation 6) is derived from the above equation (4).

Subsequently, in order to allow the engine rotational speed to approach the target, a deviation between the engine rotational speed and the target value is multiplied by a preset predetermined feedback gain, thereby calculating a feedback correction torque Tmg1fb of the first motor generator 4 and a feedback correction torque Tmg2fb of the second motor generator 5 (step 205).

The feedback correction torque Tmg1fb of the first motor generator 4 is calculated by $$Tmg1fb = -\Delta Te/(1+k1)$$

where, ΔTe denotes a change amount to the target torque of the engine torque based on the torque balance equation.

The feedback correction torque Tmg2fb of the second motor generator 5 is calculated by $$Tmg2fb = (k1/(1+k2))*Tmg1fb$$

The feedback correction amounts which are respectively set into the torque instruction values of the first motor generator 4 and the second motor generator 5 are set in association with each other on the basis of a gear ratio or lever ratio of the power transmission mechanism 9 having four rotational elements respectively coupled with the first motor generator 4, second motor generator 5, drive axis 8, and internal combustion engine 2.

The feedback correction torques Tmg1fb and Tmg2fb are added to the fundamental torques Tmg1i and Tmg2i, thereby calculating a torque instruction value Tmg1 of the first motor generator 4 and a torque instruction value Tmg2 of the second motor generator 5 (step 206).

The torque instruction value Tmg1 of the first motor generator 4 is calculated by $$Tmg1=Tmg1i+Tmg1fb$$

The torque instruction value Tmg2 of the second motor generator 5 is calculated by $$Tmg2=Tmg2i+Tmg2fb$$

By driving and controlling the first motor generator 4 and the second motor generator 5 by the calculated torque instruction values Tmg1 and Tmg2, the charge/discharge to/from the battery 18 can be set to a target value while outputting the target drive force.

After that, the program is returned (step 207).

Collinear diagrams in typical operation states are shown in FIGS. 20 to 23.

where, k1 and k2 are defined as follows.

$$k1=ZR1/ZS1$$

$$k2=ZS2/ZR2$$

where,
ZS1: The number of teeth of the first sun gear
ZR1: The number of teeth of the first ring gear
ZS2: The number of teeth of the second sun gear
ZR2: The number of teeth of the second ring gear Each operation state will be described by using the collinear diagrams of FIGS. 20 to 23.

In the collinear diagrams of FIGS. 20 to 23, the rotational speed is defined in such a manner that the rotating direction of the internal combustion engine 2 is set to the positive direction and the torque which is input/output to/from each axis is defined in such a manner that the direction in which the torque in the same direction as that of the torque of the internal combustion engine 2 is input is positive. Therefore, a case where the torque of the drive axis is positive corresponds to a state where the torque adapted to drive the vehicle rearwardly is output (deceleration at the time of forward movement; driving at the time of backward movement). On the other hand, a case where the torque of the drive axis is negative corresponds to a state where the torque adapted to drive the vehicle forwardly is output (driving at the time of forward movement; deceleration at the time of backward movement).

In the case of performing the power generation or power running (by applying the motive power to the front wheels (drive wheels), the acceleration is performed; or a balancing speed is held in an up-grade) by the first motor generator 4 and the second motor generator 5, a loss is caused by a heat generation in the first inverter 15 and the second inverter 16 or in the first motor generator 4 and the second motor generator 5. Therefore, an efficiency in the case of performing a conversion between an electric energy and a mechanical energy is not equal to 100%. However, for simplicity of description, an explanation will be made on the assumption that there is no loss.

In the case of actually considering the loss, it is sufficient to control so as to additionally power-generate by an amount of energy which is lost by the loss.

(1) LOW Gear Ratio State (Refer to FIG. 20)

A state where the vehicle runs by the internal combustion engine 2 and the rotational speed of the second motor generator 5 is equal to zero (0). A collinear diagram at this time is shown in FIG. 20. Since the rotational speed of the second motor generator 5 is equal to zero (0), no electric power is consumed. Therefore, when there is no charge/discharge to/from the battery 18, since there is no need to perform the power generation in the first motor generator 4, the torque instruction value Tmg1 of the first motor generator 4 is equal to zero (0). A ratio between the engine rotational speed and the rotational speed of the drive axis 8 is equal to (1+k2)/k2.

Figure 21:
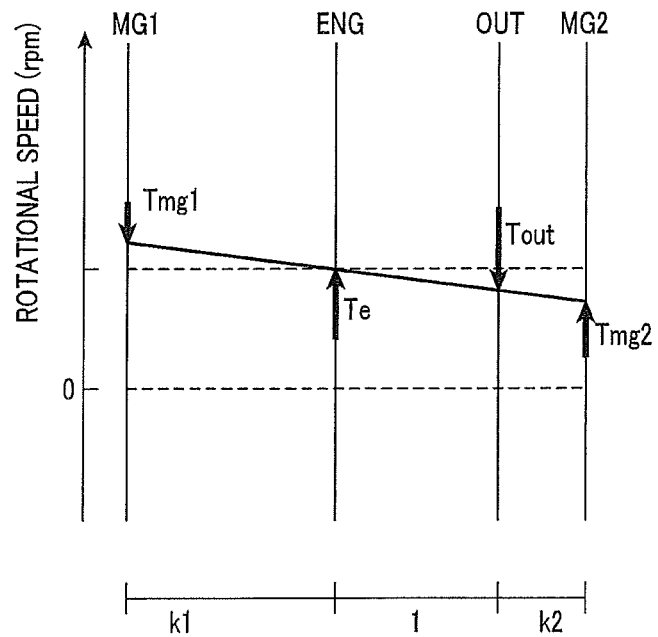
FIG. 21 is a collinear diagram of an intermediate gear ratio state. (Embodiment)

(2) Intermediate Gear Ratio State (Refer to FIG. 21)

A state where the vehicle runs by the internal combustion engine 2 and the rotational speeds of the first motor generator 4 and the second motor generator 5 are positive. A collinear diagram at this time is shown in FIG. 21. When there is no charge/discharge to/from the battery 18, the first motor generator 4 performs a regeneration and the second motor generator 5 is allowed to perform the power running by using this regenerated electric power.

Figure 22:
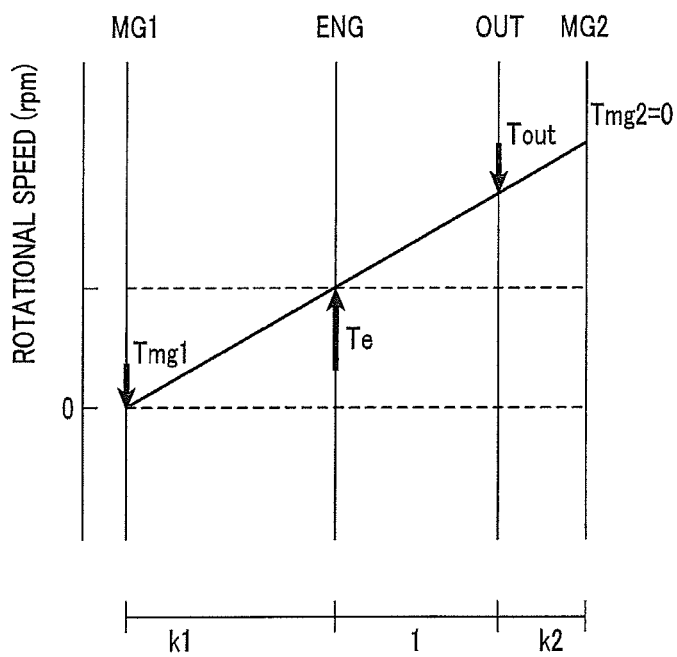
FIG. 22 is a collinear diagram of a HIGH gear ratio state. (Embodiment)

(3) HIGH Gear Ratio State (Refer to FIG. 22)

A state where the vehicle runs by the internal combustion engine 2 and the rotational speed of the first motor generator 4 is equal to zero (0). A collinear diagram at this time is shown in FIG. 22. Since the rotational speed of the first motor generator 4 is equal to zero (0), the regeneration is not performed. Therefore, when there is no charge/discharge to/from the battery 18, the power running or regeneration is not performed in the second motor generator 5 and the torque instruction value Tmg2 of the second motor generator 5 is equal to zero (0). A ratio between the engine rotational speed and the rotational speed of the drive axis 8 is equal to k1/(1+k1).

Figure 23:
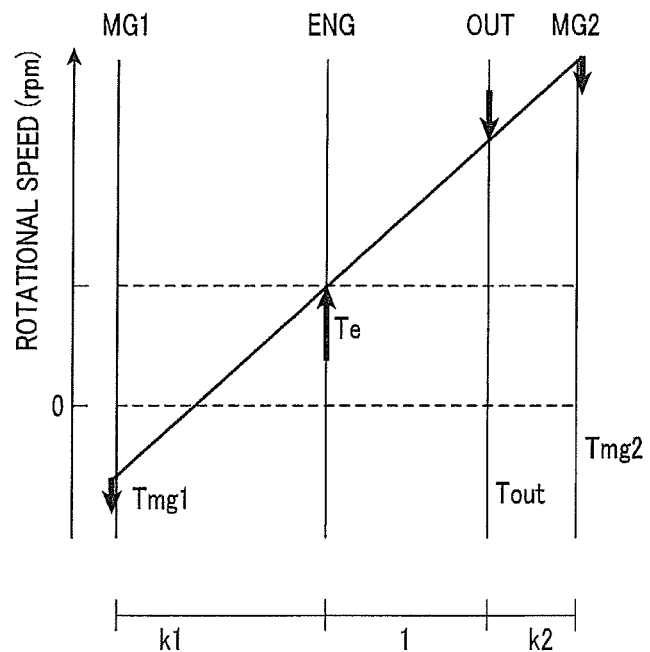
FIG. 23 is a collinear diagram of a state where a motive power circulation has occurred. (Embodiment)

(4) State where a Motive Power Circulation has Occurred (Refer to FIG. 23)

In the state where the vehicle speed is further higher than that in the HIGH gear ratio state in FIG. 22, the vehicle enters a state where the first motor generator 4 rotates reversely. In this state, the first motor generator 4 performs the power running and an electric power is consumed. Therefore, when there is no charge/discharge to/from the battery 18, the second motor generator 5 performs a regeneration and performs a power generation.

Although the embodiment of the invention has been described above, the construction of the foregoing embodiment is applied to each claim and will be described.

First, in the invention according to claim 1, the control means 17 has: the provisional target engine power calculating means 17D for calculating the provisional target engine power from the target drive power set by the target drive power setting means 17B and the target charge/discharge power set by the target charge/discharge power setting means 17C; the target engine power lower limit value calculating means 17H for calculating the target engine power lower limit value on the basis of the accelerator opening degree or the target drive force which is calculated from the accelerator opening degree; the target electric power calculating means 17K for calculating the target electric power from the difference between the target engine power and the target drive power which are calculated on the basis of the provisional target engine operation point; and the motor torque instruction value operating means 17L for setting the torque instruction value of each of the plurality of motor generators 4 and 5 on the basis of the provisional target engine operation point set by the provisional target engine operation point setting means 17E.

The provisional target engine power calculating means 17D compares the provisional target engine power which is calculated from the target drive power set by the target drive power setting means 17B and the target charge/discharge power set by the target charge/discharge power setting means 17C with the target engine power lower limit value. When the provisional target engine power is smaller than the target engine power lower limit value, the means 17D sets the target engine power lower limit value to the provisional target engine power and outputs the provisional target engine power.

The motor torque instruction value operating means 17L also calculates the torque instruction value of each of the plurality of motor generators 4 and 5 by using the torque balance equation including the target engine torque which is obtained from the target engine operation point and the electric power balance equation including the target electric power.

Thus, such a situation that the target engine power is set to a low power in dependence on the vehicle speed is reduced, and when the large drive force is requested, the output can be raised so as to make a response to such a request. Since the output improvement by the target engine power lower limit value intends to eliminate the too low output state, it is lower than the target engine power in the normal run and an excessive load is not applied to the system.

In the invention according to claim 2, the control means 17 has the electric power upper/lower limit value calculating means 17I for setting the electric power upper limit value and the electric power lower limit value to restrict the input/output electric power to/from the battery 18 on the basis of the battery state. The target engine power lower limit value calculating means 17H corrects the target engine power lower limit value so as to restrict it on the basis of the electric power lower limit value and outputs the target engine power lower limit value to the provisional target engine power calculating means 17D.

Thus, by setting the lower limit value according to the battery state, the overdischarge and overload to the battery 18 can be prevented. In a state where the raised output is continuously maintained, the power can be further restricted to the lower limit value according to the battery state.

In the invention according to claim 3, the control means 17 has the electric power loss presuming means 17J for calculating the presumption power serving as an electric power loss on the basis of the vehicle speed and the target drive force. The target engine power lower limit value calculating means 17H corrects the electric power lower limit value by using the presumption power serving as an electric power loss, corrects the target engine power lower limit value so as to restrict it on the basis of the corrected electric power lower limit value, and outputs the target engine power lower limit value to the provisional target engine power calculating means 17D.

Thus, by setting the lower limit value according to the battery state in consideration of the presumption power serving as an electric power loss of the plurality of motor generators 4 and 5, since the control precision of the charge/discharge electric power is raised, the overdischarge and overload to the battery 18 can be prevented.

INDUSTRIAL APPLICABILITY

The drive control apparatus according to the invention can be applied not only to the hybrid vehicle but also to another electric vehicle such as an electric car or the like.

REFERENCE SIGNS LIST

1 Drive control apparatus of hybrid vehicle
2 Internal combustion engine (ENG)
4 First motor generator (MG1)
5 Second motor generator (MG2)
6 Drive wheel
8 Drive axis (OUT)
9 Power transmission mechanism
15 First inverter
16 Second inverter
17 Control means
17A Target drive force setting means
17B Target drive power setting means
17C Target charge/discharge power setting means
17D Provisional target engine power calculating means
17E Provisional target engine operation point setting means
17F Target engine operation point setting means
17G Target engine power setting means
17H Target engine power lower limit value calculating means
17I Electric power upper/lower limit value calculating means
17J Electric power loss presuming means
17K Target electric power calculating means
17L Motor torque instruction value operating means
18 Battery
32 Accelerator opening degree detecting means
33 Vehicle speed detecting means
34 Battery charge state detecting means
35 Engine rotational speed detecting means
39 Battery state detecting means

The invention claimed is:
1. A drive control apparatus of a hybrid vehicle for driving and controlling a vehicle by using outputs from an internal combustion engine and a plurality of motor generators, comprising:
accelerator opening degree detecting means for detecting an accelerator opening degree;
vehicle speed detecting means for detecting a vehicle speed;
battery charge state detecting means for detecting a charge state of a battery; and
control means having target drive power setting means for setting a target drive power on the basis of the accelerator opening degree detected by the accelerator opening degree detecting means and the vehicle speed detected by the vehicle speed detecting means, target charge/discharge power setting means for setting a target charge/discharge power on the basis of at least the charge state of the battery detected by the battery charge state detecting means, provisional target engine power calculating means for calculating a provisional target engine power from the target drive power set by the target drive power setting means and the target charge/discharge power set by the target charge/discharge power setting means, provisional target engine operation point setting means for setting a provisional target engine operation point to decide a provisional target engine rotational speed and a provisional target engine torque from the provisional target engine power calculated by the provisional target engine power calculating means and a retrieval map, and motor torque instruction value operating means for setting a torque instruction value of each of the plurality of motor generators on the basis of the provisional target engine operation point set by the provisional target engine operation point setting means, wherein the control means has target engine power lower limit value calculating means for calculating a target engine power lower limit value on the basis of the accelerator opening degree or a target drive force which is calculated from the accelerator opening degree and target electric power calculating means for calculating a target electric power from a difference between a target engine power and the target drive power which are calculated on the basis of the provisional target engine operation point, and wherein the provisional target engine power calculating means compares the provisional target engine power which is calculated from the target drive power set by the target drive power setting means and the target charge/discharge power set by the target charge/discharge power setting means with the target engine power lower limit value and, when the provisional target engine power is smaller than the target engine power lower limit value, sets the target engine power lower limit value to the provisional target engine power and outputs the provisional target engine power, and the motor torque instruction value operating means calculates the torque instruction value of each of the plurality of motor generators by using a torque balance equation including a target engine torque which is obtained from the target engine operation point and an electric power balance equation including the target electric power.

2. A drive control apparatus of the hybrid vehicle according to claim 1, wherein the control means has electric power upper/lower limit value calculating means for setting an electric power upper limit value and an electric power lower limit value to restrict an input/output electric power to/from the battery on the basis of the battery state, and the target engine power lower limit value calculating means corrects the target engine power lower limit value so as to restrict it on the basis of the electric power lower limit value and outputs the target engine power lower limit value to the provisional target engine power calculating means.

3. A drive control apparatus of the hybrid vehicle according to claim 2, wherein the control means has electric power loss presuming means for calculating a presumption power serving as an electric power loss on the basis of the vehicle speed, and the target drive force and the target engine power lower limit value calculating means corrects the electric power lower limit value by using a presumption power serving as an electric power loss, corrects the target engine power lower limit value so as to restrict it on the basis of the corrected electric power lower limit value, and outputs the target engine power lower limit value to the provisional target engine power calculating means.

* * * * *